(12) United States Patent
Zhou et al.

(10) Patent No.: US 10,560,175 B2
(45) Date of Patent: Feb. 11, 2020

(54) DATA TRANSMISSION METHOD AND APPARATUS

(71) Applicant: HUAWEI TECHNOLOGIES CO., LTD., Shenzhen, Guangdong (CN)

(72) Inventors: Yue Zhou, Hangzhou (CN); Hejia Luo, Hangzhou (CN); Lu Rong, Shanghai (CN); Rong Li, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/265,837

(22) Filed: Feb. 1, 2019

(65) Prior Publication Data

US 2019/0173556 A1 Jun. 6, 2019

Related U.S. Application Data

(63) Continuation of application No. PCT/CN2017/093250, filed on Jul. 18, 2017.

(30) Foreign Application Priority Data

Aug. 12, 2016 (CN) .......................... 2016 1 0663404

(51) Int. Cl.
*H04B 7/06* (2006.01)
(52) U.S. Cl.
CPC .................................. *H04B 7/0669* (2013.01)
(58) Field of Classification Search
CPC .... G10L 2019/0007; G10L 2019/0002; H04B 7/0478; H04B 7/0669; H04L 1/0042;

(Continued)

(56) References Cited

U.S. PATENT DOCUMENTS

| | | | |
|---|---|---|---|
| 2008/0095258 A1 | 4/2008 | She et al. | |
| 2014/0140360 A1* | 5/2014 | Nikopour | H04J 13/00 370/479 |

(Continued)

FOREIGN PATENT DOCUMENTS

| | | |
|---|---|---|
| CN | 101166052 A | 4/2008 |
| CN | 102754476 B | 10/2012 |

(Continued)

OTHER PUBLICATIONS

"Song Chunxue et al, FPGA implementation of the sparse code multiple access systembased on 5G wireless communication. Application of Electronic Technique, 201607, 5 pages".

(Continued)

*Primary Examiner* — Rahel Guarino
(74) *Attorney, Agent, or Firm* — Womble Bond Dickinson (US) LLP

(57) ABSTRACT

This application provides a data transmission method and an apparatus. The method includes: obtaining, by user equipment, to-be-sent user data; performing, by the user equipment, channel encoding on the to-be-sent user data to obtain N sets of encoded data; performing, by the user equipment, codebook mapping on each of the N sets of encoded data by using a codebook, to obtain N sets of codebook-mapped data, where different sets of encoded data use codebooks that occupy mutually different non-zero physical REs, the non-zero physical RE means a non-zero waveform obtained after mapped data is mapped to a physical RE, and N is a positive integer greater than or equal to 2; and sending, by the user equipment, the N sets of codebook-mapped data to a base station.

20 Claims, 12 Drawing Sheets

(58) Field of Classification Search
CPC ... H04L 1/0057; H04L 1/1861; H04L 5/0055; H04L 5/0007; H04L 5/0057; H04L 5/023; H04L 1/0027; H04L 5/0016; H04L 1/06; H04L 25/03904; H04L 1/0058; H04L 1/0061; H04L 1/1893; H04L 25/03929; H04W 72/044; H04W 72/0453; H03M 13/1102; H03M 13/6516; H03M 13/6306; H03M 13/11; H03M 13/136; H03M 13/21; H03M 13/353; H03M 13/114; H03M 13/6393; H04J 13/0003
See application file for complete search history.

(56) References Cited

U.S. PATENT DOCUMENTS

| | | |
|---|---|---|
| 2016/0049999 A1 | 2/2016 | Taherzadeh et al. |
| 2016/0139639 A1 | 5/2016 | Dash et al. |
| 2017/0331582 A1 | 11/2017 | Yoshizawa |
| 2017/0338906 A1 | 11/2017 | Peng et al. |

FOREIGN PATENT DOCUMENTS

| | | |
|---|---|---|
| CN | 103152312 A | 6/2013 |
| CN | 104798317 A | 7/2015 |
| CN | 105306175 A | 2/2016 |
| CN | 105610480 A | 5/2016 |
| CN | 105656596 A | 6/2016 |
| WO | 2016098413 A1 | 6/2016 |

OTHER PUBLICATIONS

Huawei et al: "Sparse Code Multiple Access (SCMA) for 5G Radio Transmission", 3GPP Draft; R1-162155, vol. RAN WG1, No. Busan, Korea; Apr. 2, 2016, XP051080001, 5 pages.

* cited by examiner

|  | UE 1 | | | UE 2 | | | UE 3 | | | UE 4 | | |
|---|---|---|---|---|---|---|---|---|---|---|---|---|
|  | VN 1 | VN 2 | VN 3 | VN 4 | VN 5 | VN 6 | VN 7 | VN 8 | VN 9 | VN 10 | VN 11 | VN 12 |
| Subcarrier 1 | ■ |  |  | ■ |  |  | ■ |  |  | ■ |  |  |
| Subcarrier 2 |  | ■ |  |  | ■ |  |  | ■ |  |  | ■ |  |
| Subcarrier 3 | ■ |  |  |  |  |  |  |  |  |  |  | ■ |
| Subcarrier 4 |  |  | ■ |  |  |  |  |  | ■ |  |  |  |
| Subcarrier 5 |  | ■ |  |  | ■ |  |  |  |  |  |  |  |
| Subcarrier 6 |  |  |  |  |  | ■ | ■ |  |  |  | ■ |  |
| Subcarrier 7 |  |  |  |  | ■ |  |  |  |  |  |  | ■ |
| Subcarrier 8 |  |  | ■ |  |  | ■ |  |  | ■ |  |  |  |

DATA TRANSMISSION METHOD AND APPARATUS

CROSS-REFERENCE TO RELATED APPLICATIONS

This application is a continuation of International Application No. PCT/CN2017/093250, filed on Jul. 18, 2017, which claims priority to Chinese Patent Application No. 201610663404.8, filed on Aug. 12, 2016. The disclosures of the aforementioned applications are hereby incorporated by reference in their entireties.

TECHNICAL FIELD

This application relates to the field of communications technologies, and in particular, to a data transmission method and an apparatus.

BACKGROUND

With rapid development of a mobile communications network, both ultra-reliable communication and low latency have become objectives that need to be taken into account in a next-generation communications technology. Reliability in the ultra-reliable communication (Ultra-Reliable Communication, URC) is defined as a capability of ensuring that information is successfully transmitted within a specified latency range.

Currently, in a typical wireless communications network, for example, a Long Term Evolution (Long Term Evolution, LTE) network, in an orthogonal time-frequency resource-based access technology in Orthogonal Frequency Division Multiple Access (Orthogonal Frequency Division Multiple Access, OFDMA), ultra-reliable communication of a communications system is implemented by using asynchronous hybrid automatic repeat requests (Hybrid Automatic Repeat Request, HARQ). A specific implementation process is as follows: An evolved nodeB (Evolved Node B, eNodeB) merges HARQs based on transmission performed by user equipment (User Equipment, UE) at different transmission time intervals (Transmission Time Interval, TTI) in chronological order, thereby improving detection performance to implement the ultra-reliable communication of the communications system.

However, when the existing HARQs are used to implement the ultra-reliable communication of the communications system, reliability improvement requires mergence of information that is distributed at different TTIs in chronological order, and this leads to extra latency overheads.

SUMMARY

This application provides a data transmission method and an apparatus, so that communication reliability can be improved without extra latency overheads.

According to a first aspect, this application provides a data transmission method, including: obtaining, by user equipment, to-be-sent user data, performing channel encoding on the to-be-sent user data to obtain N sets of encoded data, and performing codebook mapping on each of the N sets of encoded data by using a codebook, to obtain N sets of codebook-mapped data; and sending, by the user equipment, the N sets of codebook-mapped data to a base station. Different sets of encoded data use codebooks that occupy mutually different non-zero physical resource elements (REs), the non-zero physical RE means a non-zero waveform obtained after mapped data is mapped to a physical RE, and N is a positive integer greater than or equal to 2. In this case, the N pieces of codebook-mapped data are mapped to different non-zero physical REs. This ensures codebook diversity of the N sets of codebook-mapped data in a transmission process. Therefore, mutual interference between the to-be-sent user data information is prevented without extra latency overheads, and communication reliability is improved by making the most of the codebook diversity.

In one embodiment, the N sets of codebook-mapped data are allocated to K antennas for transmission. Each of the N sets of codebook-mapped data is allocated to a different antenna, and K is a positive integer greater than or equal to N, so that each set of codebook-mapped data is transmitted by using a different antenna. When K is equal to N, the N sets of codebook-mapped data are allocated to K antennas for transmission, and the codebook-mapped data and the antennas are in a one-to-one correspondence. When K is greater than N, one set of codebook-mapped data may exclusively occupy a plurality of antennas at the same time for transmission. In this case, the N sets of codebook-mapped data are allocated to different antennas and transmitted by using the different antennas. This ensures that each set of codebook-mapped data can use space diversity brought by spatial locations of the different antennas, and can fully use reliability improvement brought by combined use of antenna space diversity and codebook diversity.

In one embodiment, the codebook for performing codebook mapping includes an sparse code multiple access (SCMA) codebook, an interleave-grid multiple access (IGMA) codebook, or a pattern division multiple access (PDMA) codebook. In this case, codebook mapping is performed on the N sets of encoded data by using different codebooks. This can improve reliability of codebook diversity.

In one embodiment, the user equipment performs channel encoding on the to-be-sent user data by using M channel encoders, to obtain the N sets of encoded data, where M is a positive integer less than or equal to N. In this case, a plurality of encoded data is generated after the channel encoding is performed on the to-be-sent user data. Therefore, a relatively large quantity of encoded data can be generated by using the same quantity of or fewer encoders.

In one embodiment, M is equal to N, and channel encoding is performed on the to-be-sent user data by using the M channel encoders in M encoding modes, to obtain N sets of different encoded data. In this case, each channel encoder performs encoding in a different encoding mode. This implements code diversity and ensures that at least one of the obtained N sets of totally different encoded data has a greatest encoding gain. In addition, because different channel encoding brings an encoding gain, communication reliability is enhanced by using space diversity, codebook diversity, and the encoding gain.

In one embodiment, M is less than N, and the to-be-sent user data is encoded by using the M channel encoders, with at least one channel encoder using a same encoding mode, and data obtained by using the same encoding mode is divided into at least two sets to finally obtain the N sets of encoded data. Because different channel encoding modes can bring different encoding gains, when an encoding gain in an encoding mode is determined, an encoding mode with a greatest encoding gain is selected. According to this embodiment of this application, the channel encoding is performed on the to-be-sent user data by using the M channel encoders in the encoding mode with the greatest encoding gain, and the encoded data is divided into at least two sets. This implements code diversity and can ensure that an encoding gain of the obtained N sets of encoded data is greatest.

In one embodiment, M is less than N, and the to-be-sent user data is encoded by using the M channel encoders, with different parts of the to-be-sent user data being encoded by at least one channel encoder in a same encoding mode, to obtain the N sets of encoded data. In this case, different parts of the to-be-sent user data are encoded by using at least one channel encoder in a same encoding mode. This implements code diversity and can ensure that at least one of the obtained N sets of encoded data has a greatest encoding gain. In addition, a relatively large quantity of encoded data can be generated by using a relatively small quantity of channel encoders.

In one embodiment, before the user equipment obtains the to-be-sent user data, the user equipment receives a resource configuration message sent by the base station. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the user equipment obtains the to-be-sent user data, the user equipment receives a resource configuration message sent by the base station. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the user equipment obtains the to-be-sent user data, the user equipment sends a resource configuration message to the base station. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the user equipment obtains the to-be-sent user data, the user equipment sends a resource configuration message to the base station. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, in an interaction process between the user equipment and the base station, according to a method for determining an ultra-reliable communication scheme, the user equipment sends an ultra-reliable communication request in an SR on a physical uplink control channel (PUCCH) to the base station, and uses a PUCCH Format X to send a specific ultra-reliable communication scheme and a corresponding air interface resource request to the base station based on a current channel quality indicator (CQI). The PUCCH Format X includes $\alpha$ bits that represent the channel encoding mode, $\beta$ bits that represent the codebook pair that occupies mutually different non-zero physical REs, and $\gamma$ bits that represent the antenna resource mapping mode. In this case, an orthogonal codebook pair is configured in the PUCCH Format X. Therefore, a plurality of codebooks that occupy mutually different non-zero physical REs can be determined from a physical resource.

In one embodiment, for the codebook pair that occupies mutually different non-zero physical REs and that is used when codebook mapping is performed by using N different codebooks, when user data that shares a same RE is at a same communication reliability level, the codebook pair may be allocated according to a preset rule; when not all user data that shares a same RE is at a same communication reliability level, the codebook pair may be allocated by randomly selecting a combination of codebooks that occupy mutually different non-zero physical REs. In this case, the codebook pair that occupies mutually different non-zero physical REs is allocated according to the present rule or at random. Therefore, an appropriate set of codebooks or an appropriate codebook can be selected from the plurality of codebooks that occupy mutually different non-zero physical REs for communication at different reliability levels, thereby improving system reliability.

According to a second aspect, this application provides a data transmission method, including: jointly demodulating and decoding, by a base station, N sets of codebook-mapped data from a received signal. In this case, the N sets of codebook-mapped data are jointly demodulated and decoded. Therefore, user data is reliably received and communication reliability is improved.

In one embodiment, after channel decoding is performed on the N sets of codebook-mapped data, a set of codebook-mapped data that obtains an acknowledgement (ACK) identifier is output in bits as decoded user data, or if none of the N sets of codebook-mapped data obtains any ACK identifier, any set is selected for output. In this case, the N sets of codebook-mapped data are decoded together first, and then codebook-mapped data that passes check information check is preferably output. Therefore, user data is reliably received and communication reliability is improved.

In one embodiment, after multiple access decoding is performed on the N sets of codebook-mapped data, output log-likelihood ratio (LLR) information is merged, then merged LLR information is decoded by using a channel decoder, and merged data is output in bits as decoded user data. In this case, all the codebook-mapped data is merged, merged data is decoded, and decoded data is output. Therefore, user data is reliably received and communication reliability is improved.

In one embodiment, after channel decoding is performed on the N sets of data, if an ACK identifier is obtained, a set of codebook-mapped data that obtains the ACK identifier is output in bits as decoded user data, or if none of the N sets of codebook-mapped data obtains any ACK identifier, after multiple access decoding is performed on the N sets of data, output LLR information is merged, then merged LLR information is decoded by using a channel decoder, and merged data is output in bits as decoded user data. In this case, codebook-mapped data that passes check information check is preferably output, and when none of the codebook-mapped data passes the check, LLRs of all the codebook-mapped data are merged, merged LLRs are decoded, and decoded data is output. Therefore, user data is reliably received and communication reliability is improved.

In one embodiment, before the base station receives the N sets of codebook-mapped data sent by the user equipment, the base station sends a resource configuration message to the user equipment. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the base station receives the N sets of codebook-mapped data transmitted by the user equipment, the base station receives a resource configuration message sent by the user equipment. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, in an interaction process between the user equipment and the base station, according to a method for determining an ultra-reliable communication scheme, the base station uses a downlink control information (DCI) Format X on a physical downlink control channel (PDCCH) or an enhanced physical downlink control channel (ePDCCH) to specify an ultra-reliable communication scheme for the user equipment based on a reliability requirement of the user equipment, a current CQI, and a current physical resource allocation state. In the DCI Format X, $\alpha$ bits are used to represent the channel encoding mode, $\beta$ bits are used to represent the codebook pair that occupies mutually different non-zero physical REs, and $\gamma$ bits are used to represent the antenna resource mapping mode. In this case, the codebook pair that occupies mutually different non-zero physical REs is configured in the DCI Format X on the PDCCH or the ePDCCH. Therefore, a plurality of codebooks that occupy mutually different non-zero physical REs can be determined from a physical resource.

According to a third aspect, this application provides user equipment, including: a receiving module, an encoding module, a mapping module, and a sending module. The receiving module, the encoding module, the mapping module, and the sending module are connected in order. The receiving module is configured to obtain to-be-sent user data. The encoding module is configured to perform channel encoding on the to-be-sent user data to obtain N sets of encoded data. The mapping module is configured to perform codebook mapping on each of the N sets of encoded data by using a codebook, to obtain N sets of codebook-mapped data. Different sets of encoded data use codebooks that occupy mutually different non-zero physical REs, the non-zero physical RE means a non-zero waveform obtained after mapped data is mapped to a physical RE, and N is a positive integer greater than or equal to 2. The sending module is configured to send the N sets of codebook-mapped data to a base station. In this case, the N pieces of codebook-mapped data are mapped to different non-zero physical REs. This ensures codebook diversity of the N sets of codebook-mapped data in a transmission process. Therefore, mutual interference between the to-be-sent user data information is prevented without extra latency overheads, and communication reliability is improved by making the most of the codebook diversity.

In one embodiment, the sending module allocates the N sets of codebook-mapped data to K antennas for transmission. Each of the N sets of codebook-mapped data is allocated to a different antenna, and K is a positive integer greater than or equal to N, so that each set of codebook-mapped data is transmitted by using a different antenna. When K is equal to N, the N sets of codebook-mapped data are allocated to K antennas for transmission, and the codebook-mapped data and the antennas are in a one-to-one correspondence. When K is greater than N, one set of codebook-mapped data may exclusively occupy a plurality of antennas at the same time for transmission. In this case, the N sets of codebook-mapped data are allocated to different antennas and transmitted by using the different antennas. This ensures that each set of codebook-mapped data can use space diversity brought by spatial locations of the different antennas, and can fully use reliability improvement brought by combined use of antenna space diversity and codebook diversity.

In one embodiment, the codebook for performing codebook mapping includes an SCMA codebook, an IGMA codebook, or a PDMA codebook. In this case, codebook mapping is performed on the N sets of encoded data by using different codebooks. This can improve reliability of codebook diversity.

In one embodiment, the encoding module performs channel encoding on the to-be-sent user data by using M channel encoders, to obtain the N sets of encoded data, where M is a positive integer less than or equal to N. In this case, a plurality of encoded data is generated after the channel encoding is performed on the to-be-sent user data. Therefore, a relatively large quantity of encoded data can be generated by using the same quantity of or fewer encoders.

In one embodiment, M is equal to N, and the encoding module performs channel encoding on the to-be-sent user data by using the M channel encoders in M encoding modes, to obtain N sets of different encoded data. In this case, each channel encoder performs encoding in a different encoding mode. This implements code diversity and ensures that at least one of the obtained N sets of totally different encoded data has a greatest encoding gain. In addition, because different channel encoding brings an encoding gain, communication reliability is enhanced by using space diversity, codebook diversity, and the encoding gain.

In one embodiment, M is less than N, and the encoding module encodes the to-be-sent user data by using the M channel encoders, with at least one channel encoder using a same encoding mode, and divides data obtained by using the same encoding mode into at least two sets to finally obtain the N sets of encoded data. Because different channel encoding modes can bring different encoding gains, when an encoding gain in an encoding mode is determined, an encoding mode with a greatest encoding gain is selected. According to this embodiment of this application, the channel encoding is performed on the to-be-sent user data by using the M channel encoders in the encoding mode with the greatest encoding gain, and the encoded data is divided into at least two sets. This implements code diversity and can ensure that an encoding gain of the obtained N sets of encoded data is greatest.

In one embodiment, M is less than N, and the encoding module encodes the to-be-sent user data by using the M channel encoders, with different parts of the to-be-sent user data being encoded by at least one channel encoder in a same encoding mode, to obtain the N sets of encoded data. In this case, different parts of the to-be-sent user data are encoded by using at least one channel encoder in a same encoding mode. This implements code diversity and can ensure that at least one of the obtained N sets of encoded data has a greatest encoding gain. In addition, a relatively large quantity of encoded data can be generated by using a relatively small quantity of channel encoders.

In one embodiment, before the receiving module obtains the to-be-sent user data, the receiving module receives a resource configuration message sent by the base station. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiving module obtains the to-be-sent user data, the receiving module receives a resource configuration message sent by the base station. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiving module obtains the to-be-sent user data, the sending module sends a resource configuration message to the base station. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiving module obtains the to-be-sent user data, the sending module sends a resource configuration message to the base station. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, in an interaction process between the user equipment and the base station, according to a method for determining an ultra-reliable communication scheme, the user equipment sends an ultra-reliable communication request in a (scheduling request) SR on a PUCCH to the base station, and uses a PUCCH Format X to send a specific ultra-reliable communication scheme and a corresponding air interface resource request to the base station based on a current CQI. The PUCCH Format X includes $\alpha$ bits that represent the channel encoding mode, $\beta$ bits that represent the codebook pair that occupies mutually different non-zero physical REs, and $\gamma$ bits that represent the antenna resource mapping mode. In this case, an orthogonal codebook pair is configured in the PUCCH Format X. Therefore, a plurality of codebooks that occupy mutually different non-zero physical REs can be determined from a physical resource.

In one embodiment, for the codebook pair that occupies mutually different non-zero physical REs and that is used when codebook mapping is performed by using N different codebooks, when user data that shares a same RE is at a same communication reliability level, the codebook pair may be allocated according to a preset rule; when not all user data that shares a same RE is at a same communication reliability level, the codebook pair may be allocated by randomly selecting a combination of codebooks that occupy mutually different non-zero physical REs. In this case, the codebook pair that occupies mutually different non-zero physical REs is allocated according to the present rule or at random. Therefore, an appropriate set of codebooks or an appropriate codebook can be selected from the plurality of codebooks that occupy mutually different non-zero physical REs for communication at different reliability levels, thereby improving system reliability.

According to a fourth aspect, this application provides a base station, including: a receiving module and a decoding module. The receiving module is connected to the decoding module. The receiving module is configured to receive N sets of codebook-mapped data sent by user equipment. The decoding module is configured to demodulate and decode the N sets of codebook-mapped data. In this case, the N sets of codebook-mapped data are jointly demodulated and decoded. Therefore, user data is reliably received and communication reliability is improved.

In one embodiment, after the decoding module performs channel decoding on the N sets of codebook-mapped data, a set of codebook-mapped data that obtains an ACK identifier is output in bits as decoded user data, or if none of the N sets of codebook-mapped data obtains any ACK identifier, any set is selected for output. In this case, the N sets of codebook-mapped data are decoded together first, and then codebook-mapped data that passes check information check is preferably output. Therefore, user data is reliably received and communication reliability is improved.

In one embodiment, after performing multiple access decoding on the N sets of codebook-mapped data, the decoding module merges output LLR information, then decodes the merged LLR information by using a channel decoder, and outputs merged data in bits as decoded user data. In this case, all the codebook-mapped data is merged, merged data is decoded, and decoded data is output. Therefore, user data is reliably received and communication reliability is improved.

In one embodiment, after performing channel decoding on the N sets of data, if an ACK identifier is obtained, the decoding module outputs, in bits as decoded user data, a set of codebook-mapped data that obtains the ACK identifier, or if none of the N sets of codebook-mapped data obtains any ACK identifier, after performing multiple access decoding on the N sets of data, the decoding module merges output LLR information, then decodes the merged LLR information by using a channel decoder, and outputs merged data in bits as decoded user data. In this case, codebook-mapped data that passes check information check is preferably output, and when none of the codebook-mapped data passes the check, LLRs of all the codebook-mapped data are merged, merged LLRs are decoded, and decoded data is output. Therefore, user data is reliably received and communication reliability is improved.

In one embodiment, the base station further includes a sending module, and before the receiving module receives the N sets of codebook-mapped data sent by the user equipment, the sending module sends a resource configuration message to the user equipment. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, the base station further includes a sending module, and before the receiving module receives the N sets of codebook-mapped data sent by the user equipment, the sending module sends a resource configuration message to the user equipment. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiving module receives the N sets of codebook-mapped data transmitted by the user equipment, the receiving module receives a resource configuration message sent by the user equipment. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiving module receives the N sets of codebook-mapped data transmitted by the user equipment, the receiving module receives a resource configuration message sent by the user equipment. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, in an interaction process between the user equipment and the base station, according to a method for determining an ultra-reliable communication scheme, the base station uses a DCI Format X on a PDCCH or an ePDCCH to specify an ultra-reliable communication scheme for the user equipment based on a reliability requirement of the user equipment, a current CQI, and a current physical resource allocation state. In the DCI Format X, $\alpha$ bits are used to represent the channel encoding mode, $\beta$ bits are used to represent the codebook pair that occupies mutually different non-zero physical REs, and $\gamma$ bits are used to represent the antenna resource mapping mode. In this case, the codebook pair that occupies mutually different non-zero physical REs is configured in the DCI Format X on the PDCCH or the ePDCCH. Therefore, a plurality of codebooks that occupy mutually different non-zero physical REs can be determined from a physical resource.

According to a fifth aspect, this application provides user equipment, including: a receiver, a processor, and a transmitter. The processor is separately connected to the receiver and the transmitter. The receiver is configured to obtain to-be-sent user data. The processor is configured to perform channel encoding on the to-be-sent user data to obtain N sets of encoded data; and perform codebook mapping on each of the N sets of encoded data by using a codebook, to obtain N sets of codebook-mapped data. Different sets of encoded data use codebooks that occupy mutually different non-zero physical REs, the non-zero physical RE means a non-zero waveform obtained after mapped data is mapped to a physical RE, and N is a positive integer greater than or equal to 2. The transmitter is configured to send the N sets of codebook-mapped data to a base station. In this case, the N pieces of codebook-mapped data are mapped to different non-zero physical REs. This ensures codebook diversity of the N sets of codebook-mapped data in a transmission process. Therefore, mutual interference between the to-be-sent user data information is prevented without extra latency overheads, and communication reliability is improved by making the most of the codebook diversity.

In one embodiment, the transmitter allocates the N sets of codebook-mapped data to K antennas for transmission. Each of the N sets of codebook-mapped data is allocated to a different antenna, and K is a positive integer greater than or equal to N, so that each set of codebook-mapped data is transmitted by using a different antenna. When K is equal to N, the N sets of codebook-mapped data are allocated to K antennas for transmission, and the codebook-mapped data and the antennas are in a one-to-one correspondence. When K is greater than N, one set of codebook-mapped data may exclusively occupy a plurality of antennas at the same time for transmission. In this case, the N sets of codebook-mapped data are allocated to different antennas and transmitted by using the different antennas. This ensures that each set of codebook-mapped data can use space diversity brought by spatial locations of the different antennas, and can fully use reliability improvement brought by combined use of antenna space diversity and codebook diversity.

In one embodiment, the codebook for performing codebook mapping includes an SCMA codebook, an IGMA codebook, or a PDMA codebook. In this case, codebook mapping is performed on the N sets of encoded data by using different codebooks. This can improve reliability of codebook diversity.

In one embodiment, the processor performs channel encoding on the to-be-sent user data by using M channel encoders, to obtain the N sets of encoded data, where M is a positive integer less than or equal to N. In this case, a plurality of encoded data is generated after the channel encoding is performed on the to-be-sent user data. Therefore, a relatively large quantity of encoded data can be generated by using the same quantity of or fewer encoders.

In one embodiment, M is equal to N, and the processor performs channel encoding on the to-be-sent user data by using the M channel encoders in M encoding modes, to obtain N sets of different encoded data. In this case, each channel encoder performs encoding in a different encoding mode. This implements code diversity and ensures that at least one of the obtained N sets of totally different encoded data has a greatest encoding gain. In addition, because different channel encoding brings an encoding gain, communication reliability is enhanced by using space diversity, codebook diversity, and the encoding gain.

In one embodiment, M is less than N, and the processor encodes the to-be-sent user data by using the M channel encoders, with at least one channel encoder using a same encoding mode, and divides data obtained by using the same encoding mode into at least two sets to finally obtain the N sets of encoded data. Because different channel encoding modes can bring different encoding gains, when an encoding gain in an encoding mode is determined, an encoding mode with a greatest encoding gain is selected. According to this embodiment of this application, the channel encoding is performed on the to-be-sent user data by using the M channel encoders in the encoding mode with the greatest encoding gain, and the encoded data is divided into at least two sets. This implements code diversity and can ensure that an encoding gain of the obtained N sets of encoded data is greatest.

In one embodiment, M is less than N, and the processor encodes the to-be-sent user data by using the M channel encoders, with different parts of the to-be-sent user data being encoded by at least one channel encoder in a same encoding mode, to obtain the N sets of encoded data. In this case, different parts of the to-be-sent user data are encoded by using at least one channel encoder in a same encoding mode. This implements code diversity and can ensure that at least one of the obtained N sets of encoded data has a greatest encoding gain. In addition, a relatively large quantity of encoded data can be generated by using a relatively small quantity of channel encoders.

In one embodiment, before the receiver obtains the to-be-sent user data, the receiver receives a resource configuration message sent by the base station. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiver obtains the to-be-sent user data, the receiver receives a resource configuration message sent by the base station. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiver obtains the to-be-sent user data, the transmitter sends a resource configuration message to the base station. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiver obtains the to-be-sent user data, the transmitter sends a resource configuration message to the base station. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, in an interaction process between the user equipment and the base station, according to a method for determining an ultra-reliable communication scheme, the user equipment sends an ultra-reliable communication request in an SR on a PUCCH to the base station, and uses a PUCCH Format X to send a specific ultra-reliable communication scheme and a corresponding air interface resource request to the base station based on a current CQI. The PUCCH Format X includes $\alpha$ bits that represent the channel encoding mode, $\beta$ bits that represent the codebook pair that occupies mutually different non-zero physical REs, and $\gamma$ bits that represent the antenna resource mapping mode. In this case, an orthogonal codebook pair is configured in the PUCCH Format X. Therefore, a plurality of codebooks that occupy mutually different non-zero physical REs can be determined from a physical resource.

In one embodiment, for the codebook pair that occupies mutually different non-zero physical REs and that is used when codebook mapping is performed by using N different codebooks, when user data that shares a same RE is at a same communication reliability level, the codebook pair may be allocated according to a preset rule; when not all user data that shares a same RE is at a same communication reliability level, the codebook pair may be allocated by randomly selecting a combination of codebooks that occupy mutually different non-zero physical REs. In this case, the codebook pair that occupies mutually different non-zero physical REs is allocated according to the present rule or at random. Therefore, an appropriate set of codebooks or an appropriate codebook can be selected from the plurality of codebooks that occupy mutually different non-zero physical REs for communication at different reliability levels, thereby improving system reliability.

According to a sixth aspect, this application provides a base station, including: a receiver and a processor. The receiver is connected to the processor. The receiver is configured to receive N sets of codebook-mapped data sent by user equipment. The processor is configured to demodulate and decode the N sets of codebook-mapped data. In this case, the N sets of codebook-mapped data are jointly demodulated and decoded. Therefore, user data is reliably received and communication reliability is improved.

In one embodiment, after performing channel decoding on the N sets of codebook-mapped data, the processor outputs, in bits as decoded user data, a set of codebook-mapped data that obtains an ACK identifier, or if none of the N sets of codebook-mapped data obtains any ACK identifier, selects any set for output. In this case, the N sets of codebook-mapped data are decoded together first, and then codebook-mapped data that passes check information check is preferably output. Therefore, user data is reliably received and communication reliability is improved.

In one embodiment, after performing multiple access decoding on the N sets of codebook-mapped data, the processor merges output LLR information, then decodes the merged LLR information by using a channel decoder, and outputs merged data in bits as decoded user data. In this case, all the codebook-mapped data is merged, merged data is decoded, and decoded data is output. Therefore, user data is reliably received and communication reliability is improved.

In one embodiment, after performing channel decoding on the N sets of data, if an ACK identifier is obtained, the processor outputs, in bits as decoded user data, a set of codebook-mapped data that obtains the ACK identifier, or if none of the N sets of codebook-mapped data obtains any ACK identifier, after performing multiple access decoding on the N sets of data, the processor merges output LLR information, then decodes the merged LLR information by using a channel decoder, and outputs merged data in bits as decoded user data. In this case, codebook-mapped data that passes check information check is preferably output, and when none of the codebook-mapped data passes the check, LLRs of all the codebook-mapped data are merged, merged LLRs are decoded, and decoded data is output. Therefore, user data is reliably received and communication reliability is improved.

In one embodiment, the base station further includes a transmitter, and before the receiver receives the N sets of codebook-mapped data sent by the user equipment, the transmitter sends a resource configuration message to the user equipment. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, the base station further includes a transmitter, and before the receiver receives the N sets of codebook-mapped data sent by the user equipment, the transmitter sends a resource configuration message to the user equipment. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiver receives the N sets of codebook-mapped data transmitted by the user equipment, the receiver receives a resource configuration message sent by the user equipment. The resource configuration message includes a codebook pair that occupies mutually different non-zero physical REs. In this case, the codebook pair that occupies mutually different non-zero physical REs is configured in the resource configuration message. Therefore, a plurality of codebooks that occupy mutually different non-zero physical REs can be determined from a physical resource.

In one embodiment, before the receiver receives the N sets of codebook-mapped data transmitted by the user equipment, the receiver receives a resource configuration message sent by the user equipment. The resource configuration message includes a channel encoding mode, a codebook pair that occupies mutually different non-zero physical REs, and an antenna resource mapping mode. In this case, the codebook pair that occupies mutually different non-zero physical REs is configured in the resource configuration message. Therefore, a plurality of codebooks that occupy mutually different non-zero physical REs can be determined from a physical resource.

In one embodiment, in an interaction process between the user equipment and the base station, according to a method for determining an ultra-reliable communication scheme, the base station uses a DCI Format X on a PDCCH or an ePDCCH to specify an ultra-reliable communication scheme for the user equipment based on a reliability requirement of the user equipment, a current CQI, and a current physical resource allocation state. In the DCI Format X, α bits are used to represent the channel encoding mode, β bits are used to represent the codebook pair that occupies mutually different non-zero physical REs, and γ bits are used to represent the antenna resource mapping mode. In this case, the codebook pair that occupies mutually different non-zero physical REs is configured in the DCI Format X on the PDCCH or the ePDCCH. Therefore, a plurality of codebooks that occupy mutually different non-zero physical REs can be determined from a physical resource.

According to the data transmission method and the apparatus provided in this application, after channel encoding is performed on the to-be-sent user data, codebook mapping is performed by using N codebooks that occupy mutually different non-zero physical REs, to obtain the N sets of codebook-mapped data. Because the N pieces of codebook-mapped data are mapped to different non-zero physical REs, codebook diversity of the N sets of codebook-mapped data is ensured in a transmission process. Therefore, mutual interference between the to-be-sent user data information is prevented without extra latency overheads, and communication reliability is improved by making the most of the codebook diversity.

BRIEF DESCRIPTION OF DRAWINGS

FIG. 9A and FIG. 9B are a schematic diagram of an example of sparsity of codebooks, of all UEs, that occupy mutually different non-zero physical REs in a triplexing scenario according to an embodiment of this application;

DESCRIPTION OF EMBODIMENTS

Figure 1:
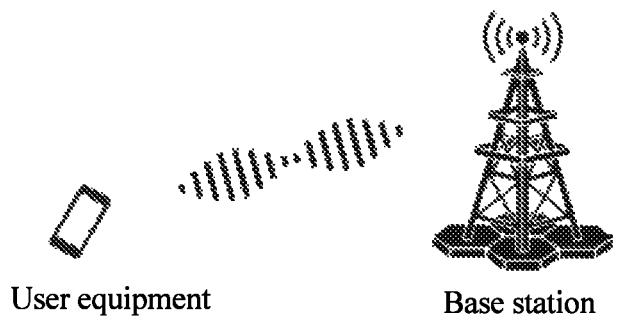
FIG. 1 is an architectural diagram of a communications system according to an embodiment of this application.

FIG. 1 is an architectural diagram of a communications system according to an embodiment of this application. As shown in FIG. 1, the communications system mainly includes a base station and user equipment. The base station is a form of a radio station. The base station is mainly used to provide wireless coverage. The base station may cover one or more user equipments, to implement radio signal transmission between a wired communications network and a wireless user terminal. The user terminal is an outermost device in a network in the communications network. The user terminal may be a mobile phone, a laptop computer, a tablet computer, or another device, but is not limited to a mobile phone in FIG. 1. When the base station communicates with the user terminal, the user equipment may send information to the base station, to be specific, the user equipment may send to-be-sent information, for example, a to-be-sent voice call, to-be-sent user data, or to-be-sent data service information, to the base station through a radio channel, and the base station receives the information by using an antenna; or the base station may send information to the user equipment, to be specific, the base station may transmit to-be-sent data, for example, a to-be-sent voice call, to-be-sent user data, or to-be-sent data service information, by using an antenna, and the user terminal receives, through a radio channel, a radio wave transmitted by the antenna and performs signal demodulation. It should be noted that other parts such as a core network included in the communications system are the same as those in an existing communications system. Details are not described in this application.

In the existing communications system, ultra-reliable communication is implemented by using a time-frequency resource-based access technology in OFDMA, and a base station merges HARQs based on transmission performed by UE at different TTIs in chronological order. However, in the technical solution of this application, for a plurality of sets of encoded data obtained after a same piece of user data is encoded, codebook mapping is performed by using a plurality of codebook pairs that occupy mutually different non-zero physical resource elements (Resource Element, RE). The non-zero physical RE means a non-zero waveform obtained after mapped data is mapped to a physical resource element RE. In this way, limited RE resources are fully used, and communication reliability is effectively improved without increasing latency overheads.

Figure 2:
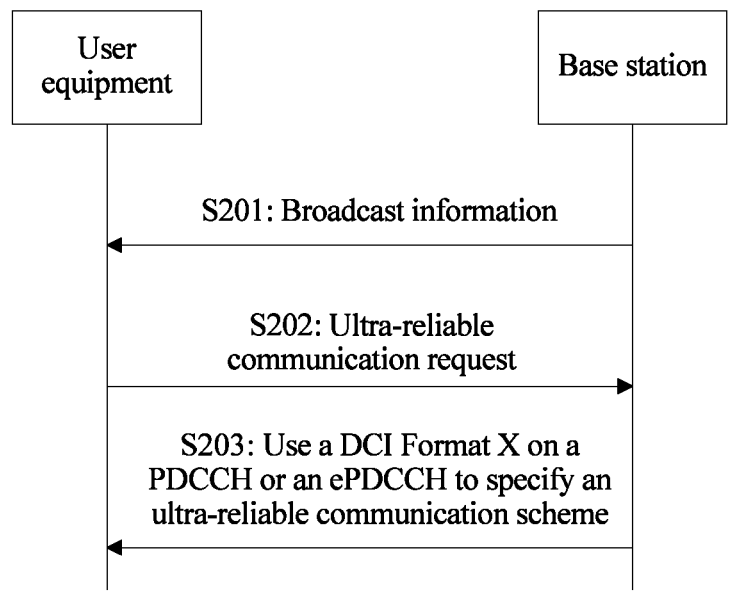
FIG. 2 is a signaling interworking diagram of determining an ultra-reliable communication scheme according to an embodiment of this application.

To ensure high reliability of data transmission in a communications system, an ultra-reliable communication (Ultra Reliable Communication, URC) scheme to be used in an interaction process between a base station and user equipment needs to be determined before the data transmission. FIG. 2 is a signaling interworking diagram of determining an ultra-reliable communication scheme according to an embodiment of this application. As shown in FIG. 2, a method for determining an ultra-reliable communication scheme includes the following operations:

Operation S201: A base station sends broadcast information to UE, and the UE receives the broadcast information. Optionally, the base station may send the broadcast information to the UE through a physical broadcast channel (Physical Broadcast Channel, PBCH). Specifically, the PBCH broadcasts a master information block (Master Information Block, MIB). The MIB includes a downlink system bandwidth, a PHICH structure, and eight most significant bits in a system frame number.

Operation S202: The UE sends an ultra-reliable communication request in an uplink scheduling request (Scheduling Request, SR) on a physical uplink control channel (Physical Uplink Control Channel, PUCCH) to the base station, and the base station receives the ultra-reliable communication request. Specifically, the uplink scheduling request includes the ultra-reliable communication request, and the ultra-reliable communication request is a special request for an application scenario of ultra-reliable communication and is equivalent to an additional parameter configured for the ultra-reliable communication scenario. The ultra-reliable communication request is indication information used by the UE to inform the base station that ultra-reliable communication is required, and to request the base station to perform the ultra-reliable communication by allocating, based on an ultra-reliable communication requirement level and a current channel quality indicator (Channel Quality Indicator, CQI), an air interface resource that supports the ultra-reliable communication, or by using an air interface resource applied in a PUCCH Format X.

Operation S203: The base station uses a DCI Format X on a PDCCH or an ePDCCH to specify an ultra-reliable communication scheme. The base station uses the downlink control information (Downlink Control Information, DCI) Format X (Format X) on the physical downlink control channel (Physical Downlink Control Channel, PDCCH) or the enhanced physical downlink control channel (Enhanced Physical Downlink Control Channel, ePDCCH) to specify the ultra-reliable communication scheme for the UE based on an ultra-reliable communication level, the current channel quality indicator (Channel Quality Indicator, CQI), and a current air interface resource allocation state that are sent in the SR by the UE. The ultra-reliable communication level to be sent in the SR by the UE may be classified into levels 1 to 16, which are represented by 0000 to 1111 in the SR. An air interface includes a channel encoding mode, a multiple access mode, and other physical layer configuration information for wireless communication. The current CQI is consistent with that in an LTE system in the prior art. Details are not described in this application. X indicates an $X^{th}$ DCI format that is to be defined in a standard. In the DCI Format X, $\alpha$ bits are used to represent the channel encoding mode, $\beta$ bits are used to represent sparse orthogonal codebook pairs, and $\gamma$ bits are used to represent the antenna resource mapping mode. The UE receives the ultra-reliable communication scheme.

Figure 3:
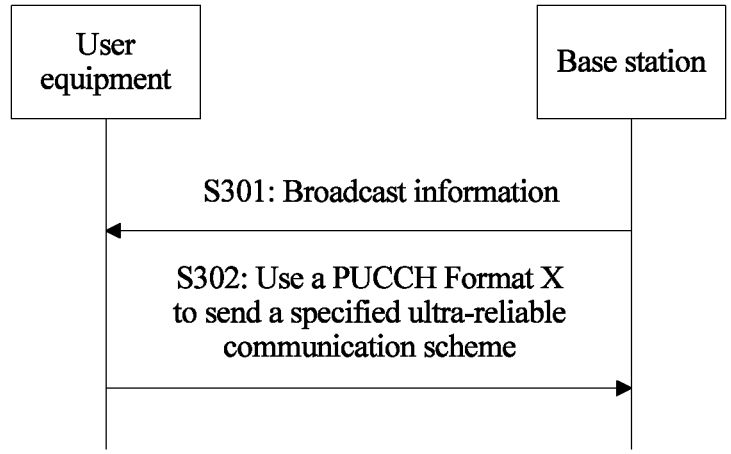
FIG. 3 is another signaling interworking diagram of determining an ultra-reliable communication scheme according to an embodiment of this application.

FIG. 3 is another signaling interworking diagram of determining an ultra-reliable communication scheme according to an embodiment of this application. As shown in FIG. 3, a method for determining an ultra-reliable communication scheme includes the following operations:

Operation S301: A base station sends broadcast information to UE, and the UE receives the broadcast information. Optionally, the base station may send the broadcast information to the UE through a physical broadcast channel (Physical Broadcast Channel, PBCH). Specifically, the PBCH broadcasts a master information block (Master Information Block, MIB). The MIB includes a downlink system bandwidth, a PHICH structure, and eight most significant bits in a system frame number.

Operation S302: The UE sends an ultra-reliable communication request in an SR on a PUCCH to the base station, and uses a PUCCH Format X to send a specific ultra-reliable communication scheme to the base station based on a current CQI. The UE arranges ultra-reliable communication schemes in descending order of complexity based on current CQIs in descending order, to compensate for reliability fading resulted from poor channel quality, thereby meeting a corresponding requirement for a high reliability level. The reliability level herein may be defined as a quantity n of data blocks that pass in a unit time. Statistically, a block error rate (block error rate, BLER) is less than 10-n, where n is a positive integer. A larger n represents a higher reliability level. A PUCCH may have a plurality of formats based on information carried on the PUCCH, and X indicates an $X^{th}$ format defined in a standard. The base station receives the ultra-reliable communication request.

Figure 4:
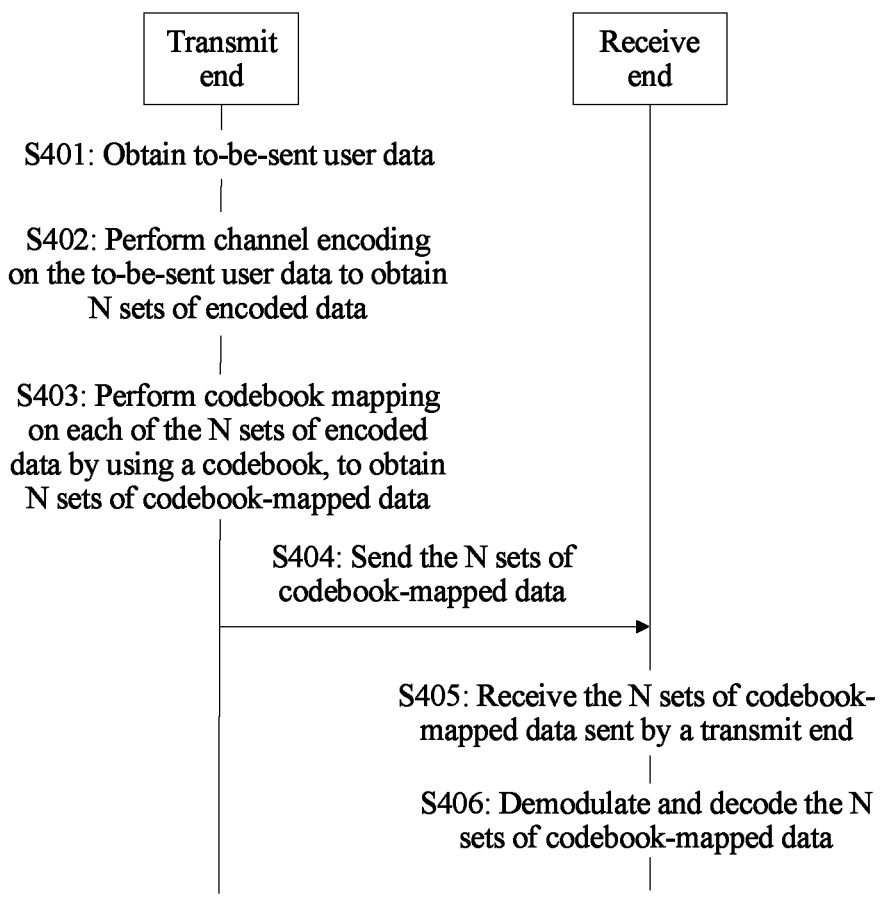
FIG. 4 is a signaling interworking diagram of a data transmission method according to a first embodiment of this application.

FIG. 4 is a signaling interworking diagram of a data transmission method according to a first embodiment of this application. As shown in FIG. 4, the data transmission method provided in this embodiment of this application includes the following operations.

Operation S401: A transmit end obtains to-be-sent user data.

Specifically, the transmit end in this embodiment of this application may be user equipment or may be a base station. When the transmit end is the user equipment, the to-be-sent user data obtained by the transmit end may be to-be-sent data of one user. When the transmit end is the base station, the to-be-sent user data obtained by the transmit end may be to-be-sent data of a plurality of users. In other words, the user equipment may send the to-be-sent user data to the base station, or the base station may send a plurality of pieces of to-be-sent user data to user equipments. This embodiment of this application is illustrated mainly by using an example in which the UE is used as the transmit end and the base station is used as a receive end. In addition, this embodiment of this application is illustrated by using an example in which the to-be-sent user data is to-be-sent data of one user. An implementation and a principle of each piece of user data when the to-be-sent user data is data of a plurality of users are the same as an implementation and a principle of one piece of user data when the to-be-sent user data is data of one user. Details are not described in this embodiment of this application.

Operation S402: The transmit end performs channel encoding on the to-be-sent user data to obtain N sets of encoded data.

Specifically, after the channel encoding is performed on the to-be-sent user data, a plurality of pieces of encoded data are generated. In this embodiment of this application, channel encoding may be performed on the to-be-sent user data by using M channel encoders, to obtain the N sets of encoded data, where M is a positive integer less than or equal to N.

Further, the performing, by the transmit end, channel encoding on the to-be-sent user data by using M channel encoders, to obtain the N sets of encoded data in operation S402 may be implemented in the following three implementations.

In a first implementation, when M is equal to N, channel encoding is performed on the to-be-sent user data by using the M channel encoders in M encoding modes, to obtain N sets of different encoded data.

Specifically, the M channel encoders are all used for the to-be-sent user data, and each channel encoder performs encoding by using a different encoding mode. N sets of different encoded data may be generated. In this way, a channel encoding gain is obtained, and reliability is enhanced. In this case, M is equal to N. For example, the to-be-sent user data is encoded by three channel encoders. One channel encoder performs encoding by using a polar code, to obtain one set of encoded data. One channel encoder performs encoding by using a turbo code, to obtain one set of encoded data. One channel encoder performs encoding by using a tail biting convolutional code (TBCC) code, to obtain one set of encoded data. In other words, three different encoding modes, namely, polar code encoding, turbo code encoding, and TBCC code encoding, are used for the to-be-sent user data to obtain three sets of totally different encoded data respectively. Because different channel encoding modes can bring different encoding gains, when an encoding gain in a different encoding mode is uncertain, according to this embodiment of this application, the channel encoding is performed on the to-be-sent user data by using the M channel encoders in the M encoding modes. This implements code diversity and can ensure that an encoding gain of at least one of the obtained N sets of totally different encoded data is greatest.

It should be noted that encoding methods and principles of the polar code, the turbo code, and the TBCC code in this embodiment of this application are the same as encoding methods and principles of the polar code, the turbo code, and the TBCC code in the prior art. Details are not described in this embodiment of this application.

In a second implementation, when M is less than N, the to-be-sent user data is encoded by using the M channel encoders, with at least one channel encoder using a same encoding mode, and data obtained by using the same encoding mode is divided into at least two sets to obtain the N sets of encoded data.

Specifically, the M channel encoders are all used for the to-be-sent user data, and at least one channel encoder encodes the to-be-sent user data in a same encoding mode. In this case, N sets of encoded data may be generated, and M is less than N. For example, the to-be-sent user data is encoded by using two channel encoders. One of the two channel encoders encodes the to-be-sent user data by using a polar code, and encoded data is divided into two sets, to obtain two sets of encoded data. The other channel encoder encodes the to-be-sent user data by using a turbo code, to obtain one set of encoded data. In other words, two different encoding modes, namely, polar code encoding and turbo code encoding, are separately used for the to-be-sent user data to obtain three sets of encoded data. Because different channel encoding modes can bring different encoding gains, when an encoding gain in an encoding mode is determined, an encoding mode with a greatest encoding gain is selected. According to this embodiment of this application, the channel encoding is performed on the to-be-sent user data by using the M channel encoders in the encoding mode with the greatest encoding gain, and the encoded data is divided into at least two sets. This implements code diversity and can ensure that an encoding gain of the obtained N sets of encoded data is greatest.

In a third implementation, M is less than N, the to-be-sent user data is encoded by using the M channel encoders, with different parts of the to-be-sent user data being encoded by at least one channel encoder in a same encoding mode, to obtain the N sets of encoded data.

Specifically, the M channel encoders are all used for the to-be-sent user data, and at least one channel encoder encodes different parts of the to-be-sent user data in a same encoding mode. In this case, N sets of partially different encoded data may be generated, and M is less than N. For example, the to-be-sent user data may be divided into A and B parts and encoded by using two channel encoders. One channel encoder encodes the to-be-sent user data by using a polar code, to obtain one set of encoded data. The other channel encoder separately encodes the A part and the B part of the to-be-sent user data by using a turbo code, to obtain two sets of encoded data. In other words, two different encoding modes, namely, polar code encoding and turbo code encoding, are separately used for the to-be-sent user data to obtain three sets of encoded data. Because different channel encoding modes can bring different encoding gains, when an encoding gain in a different encoding mode is uncertain, according to this embodiment of this application, the to-be-sent user data is encoded by using the M channel encoders, with different parts of the to-be-sent user data being encoded by at least one channel encoder in a same encoding mode. This implements code diversity and can ensure that an encoding gain of at least one of the obtained N sets of encoded data is greatest. In addition, a relatively large quantity of encoded data can be generated by using a relatively small quantity of channel encoders.

It should be noted that the performing channel encoding on the to-be-sent user data by using the M channel encoders, to obtain the N sets of encoded data in this embodiment of this application is not limited to the foregoing three implementations. Alternatively, the channel encoding may be performed on the to-be-sent user data by using the M channel encoders, with M being equal to N, and all channel encoders using a same encoding mode, to obtain the N sets of totally identical encoded data. Alternatively, the channel encoding may be performed on the to-be-sent user data by using the M channel encoders, with M being equal to N, the M channel encoders using K encoding modes, and K being less than M, to obtain the N sets of encoded data. No limitation or details are described in this embodiment of this application.

Operation S403: The transmit end performs codebook mapping on each of the N sets of encoded data by using a codebook, to obtain N sets of codebook-mapped data.

Different sets of encoded data use codebooks that occupy mutually different non-zero physical resource elements (Resource Element, RE), the non-zero physical RE means a non-zero waveform obtained after mapped data is mapped to a physical RE, and N is a positive integer greater than or equal to 2.

It should be noted that the RE is a smallest resource unit in an LTE physical resource (time-frequency domain resource).

Specifically, after the channel encoding is performed on the to-be-sent user data, the obtained N sets of encoded data are mapped by using codebooks that occupy mutually different non-zero physical REs, in other words, codebook mapping is performed on the N sets of encoded data by using codebook pairs formed by N codebooks that occupy mutually different non-zero physical REs, and then N sets of codebook-mapped data are transmitted. In this embodiment of this application, the codebooks that occupy mutually different non-zero physical REs may be defined as orthogonal codebooks, and the codebook pairs formed by N codebooks that occupy mutually different non-zero physical REs is defined as orthogonal codebook pairs. In this case, the N pieces of codebook-mapped data are mapped to different non-zero physical REs. This ensures codebook diversity of the N sets of codebook-mapped data in a transmission process. Because in a same timeslot, different REs are located on different subcarriers, but channels for different subcarriers are different to some extent (the difference is particularly evident on a frequency selective fading channel), codebook diversity brought by frequencies of the subcarriers is used by the N sets of codebook-mapped data in the transmission process.

In this embodiment of this application, information of each of the N sets of encoded data is mapped to a different subcarrier by using codebooks that occupy mutually different non-zero physical REs. In this way, information of to-be-sent data of one user is not superimposed on a same subcarrier, and there is no need to merge HARQs based on transmission performed at different TTIs in chronological order. Therefore, mutual interference between data information of one user is prevented without extra latency overheads, and communication reliability is improved by making the most of the codebook diversity.

Further, in operation S403, the user equipment and the base station in this embodiment of this application need to determine, from a physical resource, N codebooks that occupy mutually different non-zero physical REs. In this embodiment of this application, the N codebooks that occupy mutually different non-zero physical REs may be determined for data of one user in the following two implementations.

In a first implementation, before operation S401, the transmit end receives a resource configuration message sent by the receive end. The resource configuration message includes a codebook pair that occupies mutually different non-zero physical REs. Optionally, the resource configuration message further includes a channel encoding mode and/or an antenna resource mapping mode.

Correspondingly, the receive end sends the resource configuration message to the transmit end. The resource configuration message includes the codebook pair that occupies mutually different non-zero physical REs. Optionally, the resource configuration message further includes a channel encoding mode and/or an antenna resource mapping mode.

Specifically, when the receive end specifies an ultra-reliable communication scheme for the transmit end, the resource configuration message may be sent to indicate a specific type of air interface resource to be used by the transmit end. The air interface resource includes a sparse codebook pair, or may include an antenna resource and/or a channel encoding set. The transmit end schedules, based on the URC scheme indicated by the receive end, the air interface resource to perform the URC scheme. The receive end performs corresponding sparse codebook, channel encoding, and antenna resource mapping based on the URC scheme planned by the receive end. The codebook pair that occupies mutually different non-zero physical REs in the resource configuration message may be a specified codebook pair that occupies mutually different non-zero physical REs and that is determined for the transmit end by the received end based on a reliability requirement of the transmit end, a CQI, and a current physical resource allocation state when user data that shares a same RE is at a same communication reliability level; or may be a set of codebook pair that occupies mutually different non-zero physical REs and that is randomly determined by the received end from a plurality of sets of codebook pairs that occupy mutually different non-zero physical REs when not all user data that shares a same RE is at a same communication reliability level. In this embodiment of this application, the codebook pairs formed by N codebooks that occupy mutually different non-zero physical REs may be defined as orthogonal codebook pairs. For example, a physical resource includes three sets of codebook pairs that occupy mutually different non-zero physical REs. The codebook pairs are referred to as orthogonal codebook pairs in the following and marked as an orthogonal codebook pair 1, an orthogonal codebook pair 2, and an orthogonal codebook pair 3. The receive end may determine, based on a reliability requirement of the transmit end, a CQI, and a current physical resource allocation state, that the transmit end needs to perform mapping by using the orthogonal codebook pair 1, and sends the orthogonal codebook pair 1 to the transmit end by using a resource configuration message. Alternatively, the receive end may randomly select any one orthogonal codebook pair from the orthogonal codebook pair 1, the orthogonal codebook pair 2, and the orthogonal codebook pair 3, and sends the orthogonal codebook pair to the transmit end by using a resource configuration message. In addition, in another case, one orthogonal codebook pair in a physical resource includes three mutually orthogonal codebooks: an orthogonal codebook 1, an orthogonal codebook 2, and an orthogonal codebook 3. However, the transmit end needs only two orthogonal codebooks to perform mapping. In this case, the receive end may determine, based on a reliability requirement of the transmit end, a CQI, and a current physical resource allocation state, that the transmit end needs to perform mapping by using an orthogonal codebook pair formed by the orthogonal codebook 1 and the orthogonal codebook 2, and send the orthogonal codebook 1 and the orthogonal codebook 2 to the transmit end by using a resource configuration message. Alternatively, the receive end may randomly select any one orthogonal codebook pair from three orthogonal codebook pairs formed by the orthogonal codebook 1 and the orthogonal codebook 2, by the orthogonal codebook 1 and the orthogonal codebook 3, and by the orthogonal codebook 2 and the orthogonal codebook 3, and send the orthogonal codebook pair formed by the orthogonal codebook 1 and the orthogonal codebook 2, or by the orthogonal codebook 1 and the orthogonal codebook 3, or by the orthogonal codebook 2 and the orthogonal codebook 3 to the transmit end by using a resource configuration message.

It should be noted that the resource configuration message sent by the receive end may be an indication message that is sent independently, or may be an indication message that is carried in a DCI Format X on a PDCCH or an ePDCCH. The DCI Format X in the PDCCH or the ePDCCH includes α bits that represent a channel encoding mode, β bits that represent an orthogonal codebook pair, and γ bits that represent an antenna resource mapping mode.

In a second implementation, before operation S401, the transmit end sends a resource configuration message to the receive end. The resource configuration message includes a codebook pair that occupies mutually different non-zero physical REs. Optionally, the resource configuration message further includes a channel encoding mode and/or an antenna resource mapping mode. Correspondingly, the receive end receives the resource configuration message sent by the transmit end. The resource configuration message includes the codebook pair that occupies mutually different non-zero physical REs. Optionally, the resource configuration message further includes the channel encoding mode and/or the antenna resource mapping mode.

Specifically, when the transmit end sends a specified ultra-reliable communication scheme to the receive end, the resource configuration message may be sent to indicate a specific type of air interface resource to be scheduled by the receive end. The air interface resource includes a sparse codebook pair, or may include an antenna resource and/or a channel encoding set. The receive end enables, based on the URC scheme requested by the transmit end, the corresponding air interface resource to perform the URC scheme. The receive end performs corresponding sparse codebook, channel encoding, and antenna resource mapping based on the URC scheme requested by the transmit end. An orthogonal codebook pair in the resource configuration message may be a specified orthogonal codebook pair that is determined by the transmit end based on a reliability requirement of the transmit end, a CQI, and a current physical resource allocation state; or may be one orthogonal codebook pair that is randomly determined by the transmit end from a plurality of codebook pairs. For example, a physical resource includes three orthogonal codebook pairs: an orthogonal codebook pair 1, an orthogonal codebook pair 2, and an orthogonal codebook pair 3. The transmit end may determine, based on a reliability requirement of the transmit end, a CQI, and a current physical resource allocation state, that mapping needs to be performed by using the orthogonal codebook pair 1, and send the orthogonal codebook pair 1 to the receive end by using a resource configuration message. Alternatively, the transmit end may randomly select any one orthogonal codebook pair from the orthogonal codebook pair 1, the orthogonal codebook pair 2, and the orthogonal codebook pair 3, and send the orthogonal codebook pair to the receive end by using a resource configuration message. In addition, in another case, one orthogonal codebook pair in a physical resource includes three mutually orthogonal codebooks: an orthogonal codebook 1, an orthogonal codebook 2, and an orthogonal codebook 3. However, the transmit end needs only two orthogonal codebooks to perform mapping. In this case, the transmit end may determine, based on a reliability requirement of the transmit end, a CQI, and a current physical resource allocation state, that mapping needs to be performed by using an orthogonal codebook pair formed by the orthogonal codebook 1 and the orthogonal codebook 2, and send the orthogonal codebook 1 and the orthogonal codebook 2 to the receive end by using a resource configuration message. Alternatively, the transmit end may randomly select any one orthogonal codebook pair from three orthogonal codebook pairs formed by the orthogonal codebook 1 and the orthogonal codebook 2, by the orthogonal codebook 1 and the orthogonal codebook 3, and by the orthogonal codebook 2 and the orthogonal codebook 3, and send the orthogonal codebook pair formed by the orthogonal codebook 1 and the orthogonal codebook 2, or by the orthogonal codebook 1 and the orthogonal codebook 3, or by the orthogonal codebook 2 and the orthogonal codebook 3 to the receive end by using a resource configuration message.

It should be noted that the resource configuration message sent by the transmit end may be an indication message that is sent independently, or may be an indication message that is carried in a PUCCH Format X. The PUCCH Format X includes α bits that represent a channel encoding mode, β bits that represent an orthogonal codebook pair, and γ bits that represent an antenna resource mapping mode.

Further, in operation S403, the codebook for performing codebook mapping includes a sparse code multiple access (Sparse Code Multiple Access, SCMA) codebook, an interleave-grid multiple access (Interleave-Grid Multiple Access, IGMA) codebook, or a pattern division multiple access (Pattern division multiple access, PDMA) codebook.

Figure 5:
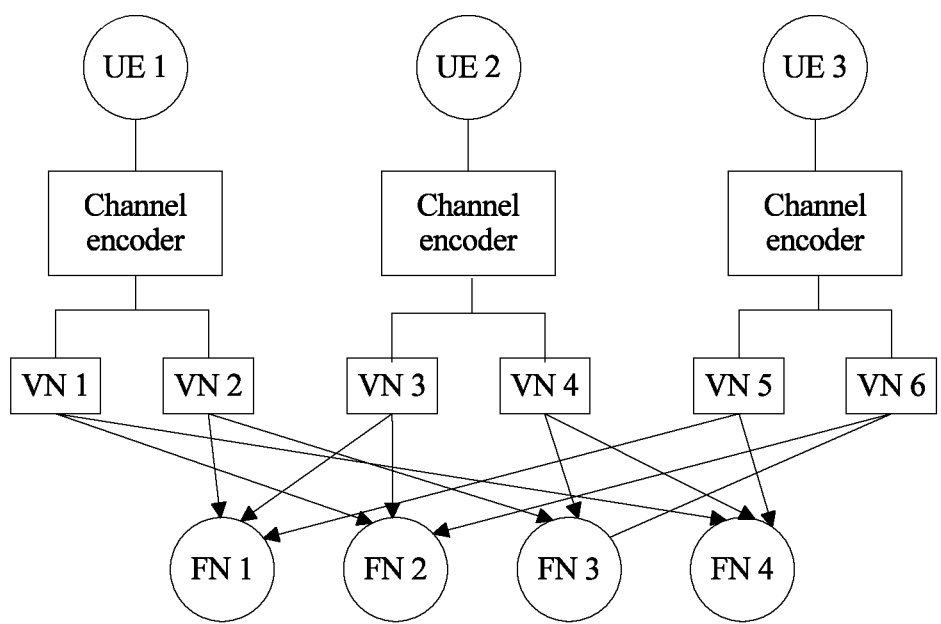
FIG. 5 is a schematic principle diagram of a transmit end according to a first embodiment of this application.

Specifically, FIG. 5 is a schematic principle diagram of a transmit end according to a first embodiment of this application. As shown in FIG. 5, this embodiment of this application is illustrated by using an example in which two sets of codebook-mapped data are generated, but is not limited to the example; and this embodiment of this application is illustrated by using an SCMA codebook as an example, but is not limited to the example. SCMA is an access technology based on sparse code space. A correspondence between data layers (Layer) and REs may be indicated by using a factor graph (Factor Graph). In FIG. 5, a function node (Function Node, FN) represents an RE, and a variable node (Variable Node, VN) represents an SCMA data layer. In the SCMA, data is mapped to a plurality of REs through sparse spreading. A mapping relationship between the data and the REs is determined by a codebook and is represented by connection lines between VNs and FNs. The codebook determines a modulation mode and a spreading mode of an encoded information bit in multi-dimensional space. The sparse codebook has a low-density spreading feature. Non-zero elements are mapped to no more than half of the REs. Sparsity of the codebook space enables different SCMA data layers to superimpose on a same RE in the SCMA and enables detection to be performed in a close-to-optimal manner. As shown in FIG. 5, the transmit end obtains three pieces of to-be-sent user data of UE 1, UE 2, and UE 3. The UE 1 is used as an example. After channel encoding is performed on the to-be-sent data of the UE 1, two sets of encoded data are generated and corresponding to a VN 1 and a VN 2. In the SCMA, data on the VN 1 is separately mapped, through sparse spreading, to REs corresponding to an FN 2 and an FN 4, and data on the VN 2 is separately mapped to REs corresponding to an FN 1 and an FN 3. Because far more data layers than a specified quantity of orthogonal REs can be superimposed in the SCMA (overloading), compared with OFDMA, the SCMA may provide more user data accesses when quantities of REs are the same, or provide more reliable transmission when quantities of user data are the same.

Operation S404: The transmit end sends the N sets of codebook-mapped data to a receive end.

Specifically, the N sets of codebook-mapped data obtained after the channel encoded data are mapped by using N codebooks that occupy mutually different non-zero physical REs may be allocated to an antenna for transmission. The N codebooks that occupy mutually different non-zero physical REs ensure that each set of codebook-mapped data can fully use codebook diversity in a transmission process to improve communication reliability.

Further, in operation S404, the transmit end allocates the N sets of codebook-mapped data to K antennas for transmission. Each of the N sets of codebook-mapped data is allocated to a different antenna, and K is a positive integer greater than or equal to N, so that each set of codebook-mapped data is transmitted by using a different antenna.

Specifically, in this embodiment of this application, the N sets of codebook-mapped data obtained after the channel encoded data are mapped by using N codebooks that occupy mutually different non-zero physical REs are transmitted on different antenna resources, so that each set of codebook-mapped data is transmitted by using a different antenna. This ensures that each set of codebook-mapped data can use space diversity brought by spatial locations of the different antennas. In addition, when the N sets of codebook-mapped data are allocated to the K antennas for transmission, and K is greater than or equal to N, space diversity can be implemented, and reliability is enhanced. In this embodiment of this application, the transmitting the N sets of codebook-mapped data on different antenna resources may be implemented in the following two implementations. In an implementation, the N sets of codebook-mapped data are allocated to the K antennas for transmission, the codebook-mapped data and the antennas are in a one-to-one correspondence. In this case, N is equal to K. In other words, one set of codebook-mapped data is transmitted by using one antenna. In the other implementation, the N sets of codebook-mapped data are allocated to the K antennas for transmission, and each set of codebook-mapped data may correspond to a plurality of antennas. In this case, N is less than K. In other words, at least one of the N sets of codebook-mapped data may exclusively occupy a plurality of antennas at the same time for transmission.

It should be noted that transmission of the N sets of codebook-mapped data in this embodiment of this application is not limited to the foregoing two implementations. The N sets of codebook-mapped data may be transmitted by using one antenna. However, in this implementation, a space diversity feature is not fully used and limited reliability improvement can be brought.

In this embodiment of this application, communication reliability is improved by combined use of space diversity brought by a plurality of antennas and codebook diversity brought by codebooks that occupy mutually different non-zero physical REs, without extra overheads, and a block error rate (Block Error Rate, BLER) curve drops acceleratingly as a signal-to-noise ratio (Signal-to-Noise Ratio, SNR) rises.

Figure 6:
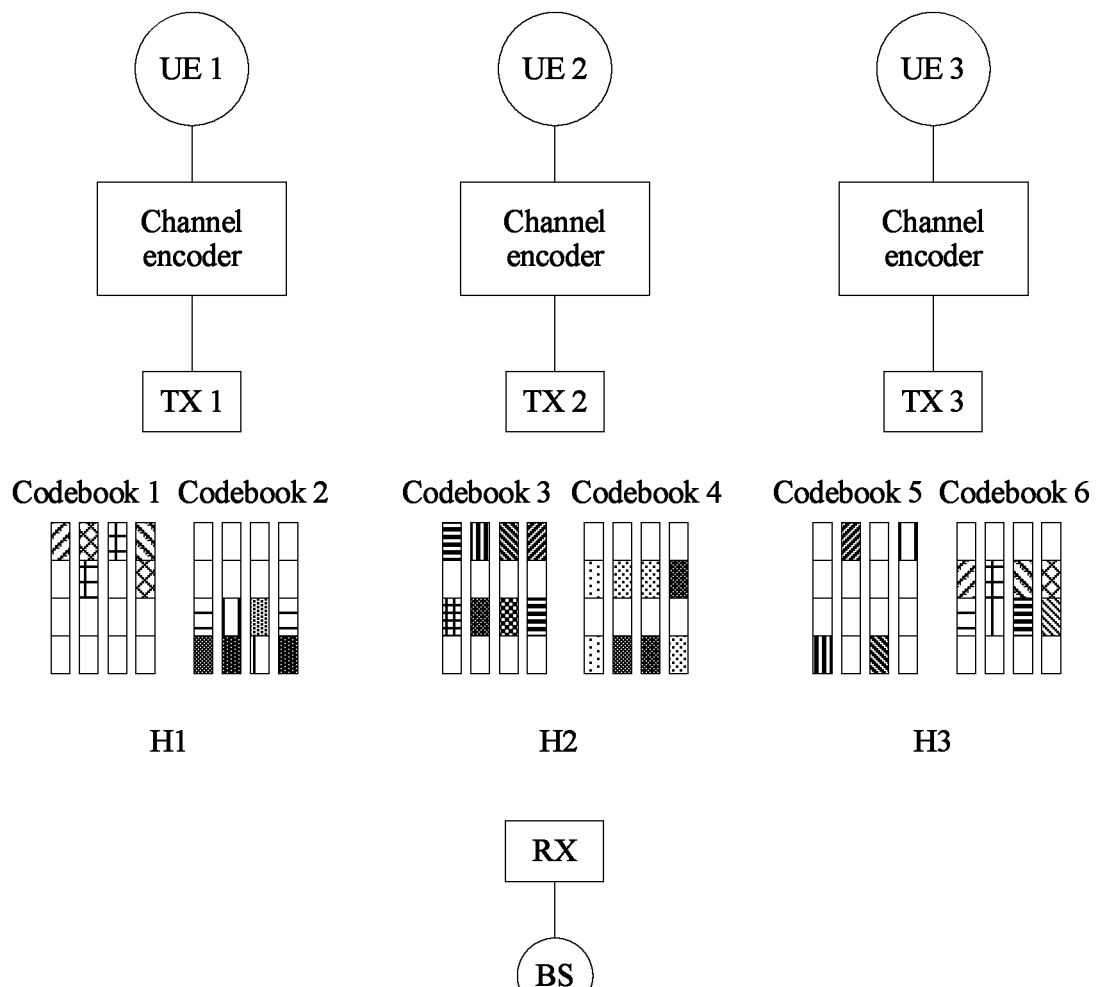
FIG. 6 is a schematic principle diagram of generating two sets of codebook-mapped data according to a first embodiment of this application.

For example, FIG. 6 is a schematic principle diagram of generating two sets of codebook-mapped data according to a first embodiment of this application. As shown in FIG. 6, a transmit end obtains three pieces of to-be-sent user data of UE 1, UE 2, and UE 3. The UE 1 is used as an example. After the to-be-sent data of the UE 1 is encoded by one channel encoder, two sets of encoded data are generated. The two sets of encoded data are mapped by using two sparse codebooks (a codebook 1 and a codebook 2) that occupy mutually different non-zero physical REs, to generate two sets of codebook-mapped data. The two sets of codebook-mapped data are allocated to an antenna H1 for transmission. In FIG. 6, the codebook mapping is performed by using codebooks that occupy mutually different non-zero physical REs. This ensures that each codebook-mapped data can fully use codebook diversity in a transmission process to improve communication reliability.

Figure 7:
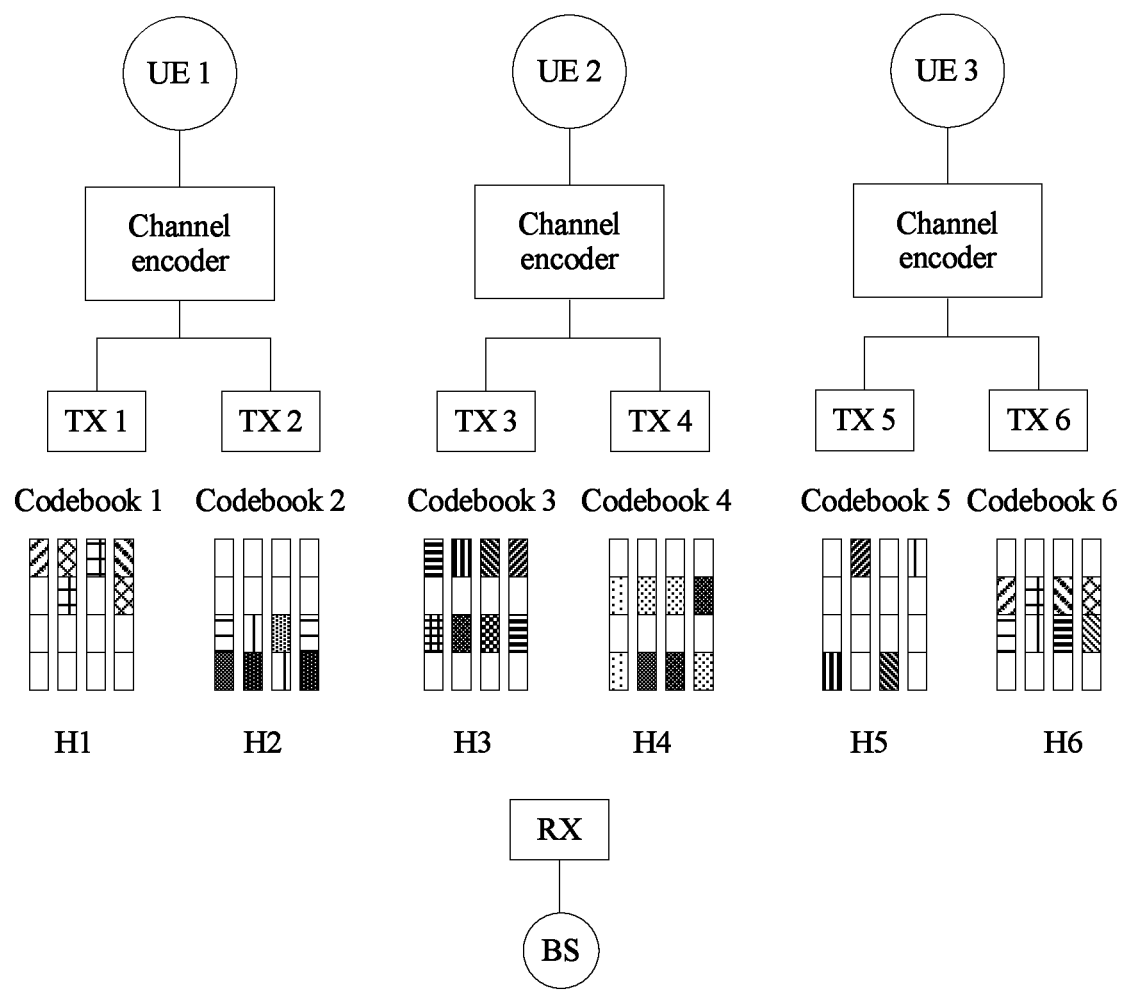
FIG. 7 is a schematic principle diagram of generating two sets of codebook-mapped data according to a second embodiment of this application.

FIG. 7 is a schematic principle diagram of generating two sets of codebook-mapped data according to a second embodiment of this application. As shown in FIG. 7, a transmit end obtains three pieces of to-be-sent user data of UE 1, UE 2, and UE 3. The UE 1 is used as an example. After the to-be-sent data of the UE 1 is encoded by one channel encoder, two sets of encoded data are generated. The two sets of encoded data are mapped by using two sparse codebooks (a codebook 1 and a codebook 2) that occupy mutually different non-zero physical REs, to generate two sets of codebook-mapped data. This ensures that each codebook-mapped data can fully use codebook diversity in a transmission process. The two sets of codebook-mapped data are allocated to antennas H1 and H2 for transmission. In other words, one set of codebook-mapped data corresponds to one antenna for transmission. Transmission on different antenna resources ensures that each codebook-mapped data can use codebook diversity brought by spatial locations of the different antennas. In FIG. 7, reliability improvement brought by combined use of antenna space diversity and codebook diversity is fully used.

Figure 8:
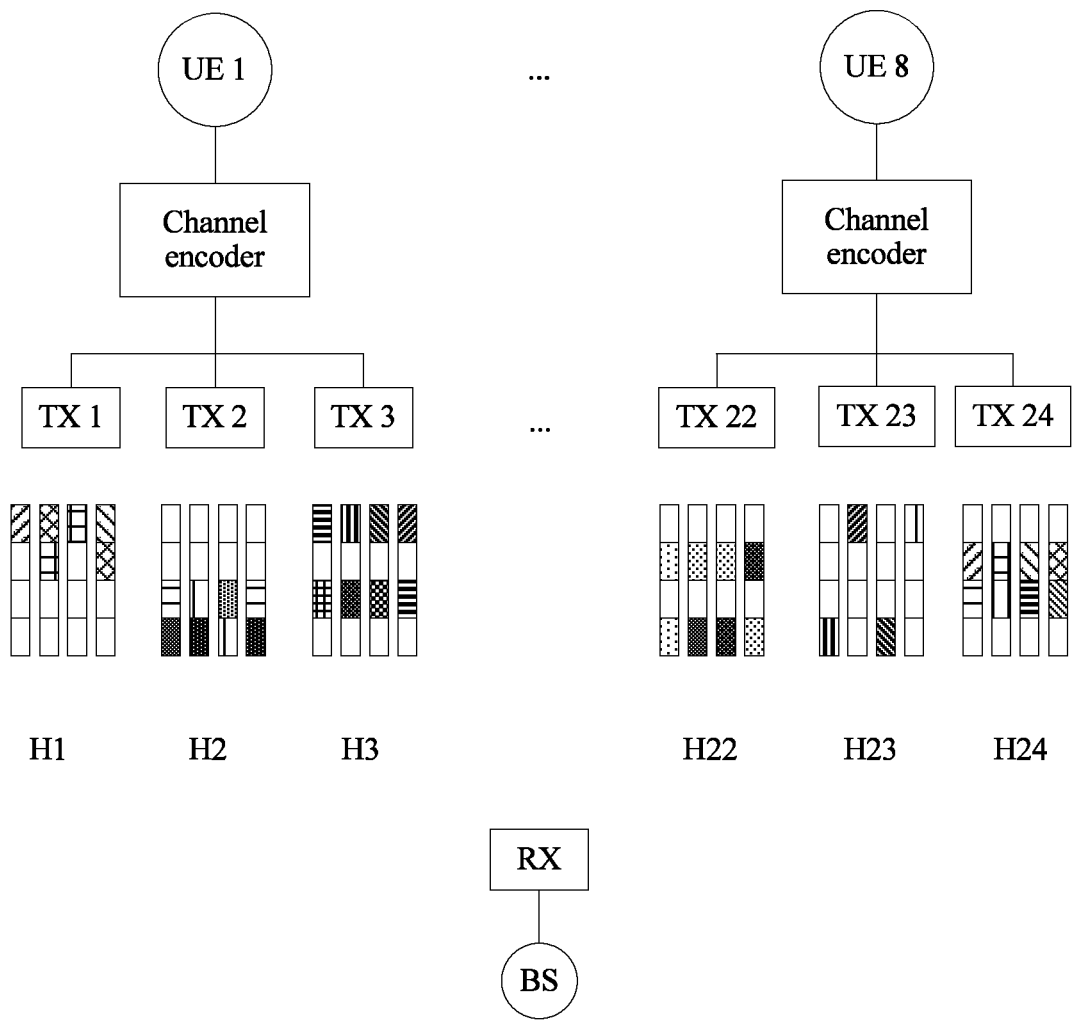
FIG. 8 is a schematic principle diagram of generating three sets of codebook-mapped data according to a first embodiment of this application.
Figure 9B:
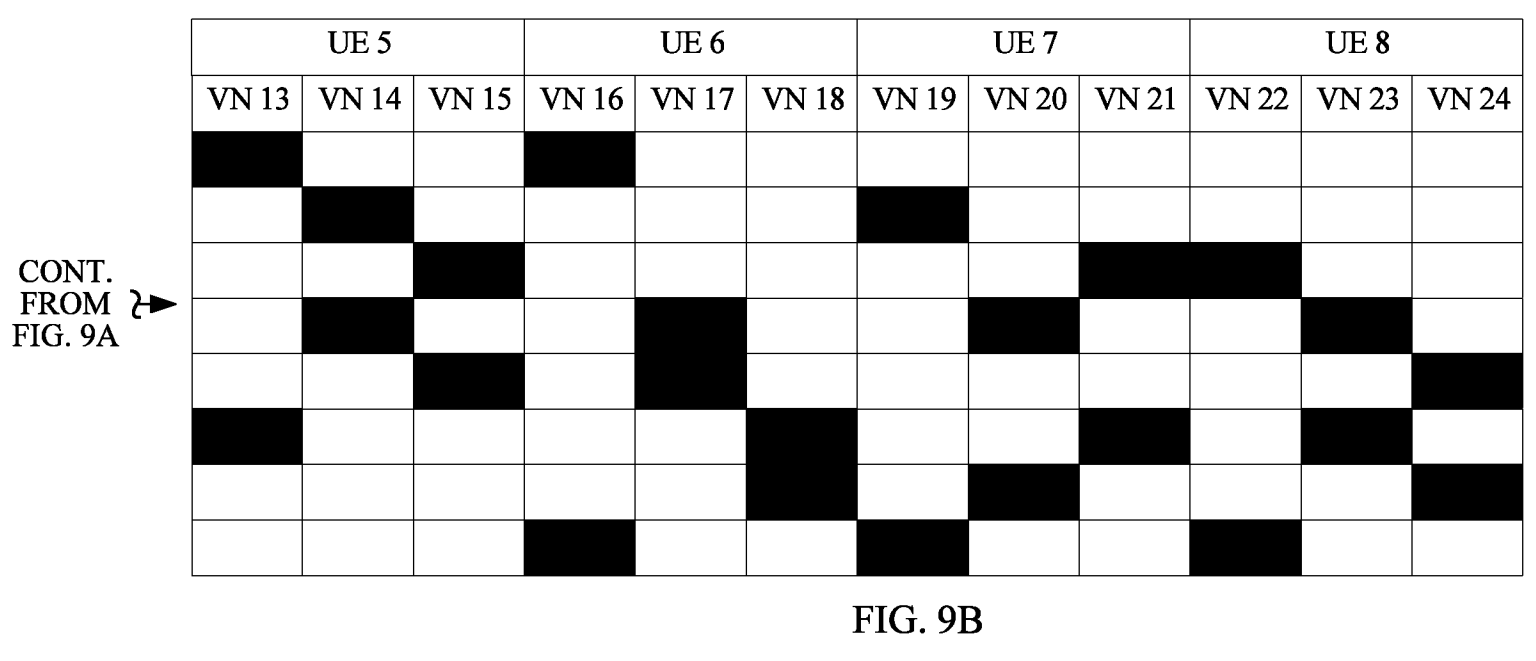

FIG. 8 is a schematic principle diagram of generating three sets of codebook-mapped data according to a first embodiment of this application. FIG. 9A and FIG. 9B are a schematic diagram of an example of sparsity of codebooks, of all UEs, that occupy mutually different non-zero physical REs in a triplexing scenario according to an embodiment of this application. As shown in FIG. 8 to FIG. 9B, a transmit end obtains eight pieces of to-be-sent user data of UE 1, UE 2, . . . , and UE 8. The UE 1 is used as an example. After the to-be-sent data of the UE 1 is encoded by one channel encoder, three sets of encoded data are generated. FIG. 8 to FIG. 9B are illustrated by using an example in which the to-be-sent data of the UE 1 is encoded by one channel encoder, but is not limited to the example. The to-be-sent data of the UE 1 may be encoded by two or three channel encoders. Three sets of encoded data are mapped by using three sparse codebooks (a codebook 1, a codebook 2, and a codebook 3) that occupy mutually different non-zero physical REs, to generate three sets of codebook-mapped data. This brings codebook diversity for transmission of the three sets of codebook-mapped data. When ultra-reliable transmission is performed on each piece of user data by using three codebooks that occupy mutually different non-zero physical REs, the eight pieces of user data may be superimposed on eight REs at the same time. Distribution of subcarriers of the REs to which sparse codebook pairs, used by all the user data, that occupy mutually different non-zero physical REs and all codebooks are mapped may be shown in FIG. 9A and FIG. 9B. The three sets of codebook-mapped data are allocated to antennas H1, H2, and H3 for transmission. In other words, one set of codebook-mapped data corresponds to one antenna for transmission. All the codebook-mapped data obtained after mapping by using sparse codebooks that occupy mutually different non-zero physical REs is transmitted by using three different antennas. This brings space diversity for transmission of the codebook-mapped data. In FIG. 9A and FIG. 9B, ultra-reliable transmission is enhanced by combined use of the three orthogonal codebooks and the three antennas.

Figure 10:
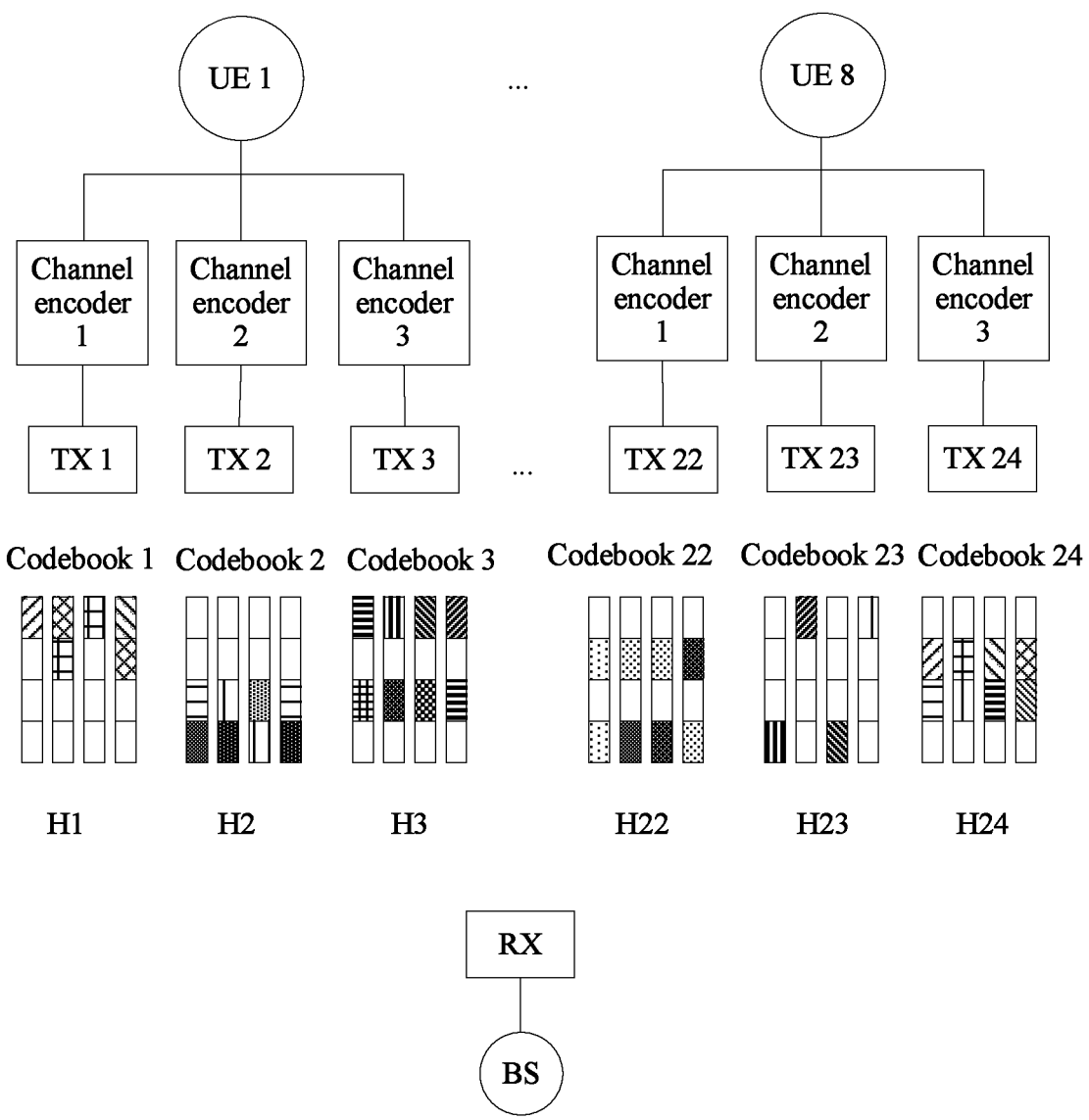
FIG. 10 is a schematic principle diagram of generating three sets of codebook-mapped data according to a second embodiment of this application.

FIG. 10 is a schematic principle diagram of generating three sets of codebook-mapped data according to a second embodiment of this application. As shown in FIG. 10, a transmit end obtains eight pieces of to-be-sent user data of UE 1, UE 2, . . . , and UE 8. The UE 1 is used as an example. After the to-be-sent data of the UE 1 is encoded by three channel encoders in three channel encoding modes, three sets of encoded data are generated. The three sets of encoded data are mapped by using three sparse codebooks (a codebook 1, a codebook 2, and a codebook 3) that occupy mutually different non-zero physical REs, to generate three sets of codebook-mapped data. This brings codebook diversity for transmission of the three sets of codebook-mapped data. Then, three antenna resources H1, H2, and H3 are selected for transmission. In FIG. 10, because different channel encoding brings an encoding gain, communication reliability is enhanced by using space diversity, codebook diversity, and the encoding gain.

It should be noted that in FIG. 6 to FIG. 10, TX indicates a transmitter, RX indicates a receiver, and BS indicates a base station. This embodiment of this application is illustrated by using two sets of codebook-mapped data and three sets of codebook-mapped data as examples. An implementation and a principle of the N sets of codebook-mapped data are the same as implementations and principles of the two sets of codebook-mapped data and the three sets of codebook-mapped data. Details are not described in this embodiment of this application. In FIG. 6 to FIG. 8 and FIG. 10, different graphics in each set of codebook-mapped data indicate different modulated information.

Figure 11:
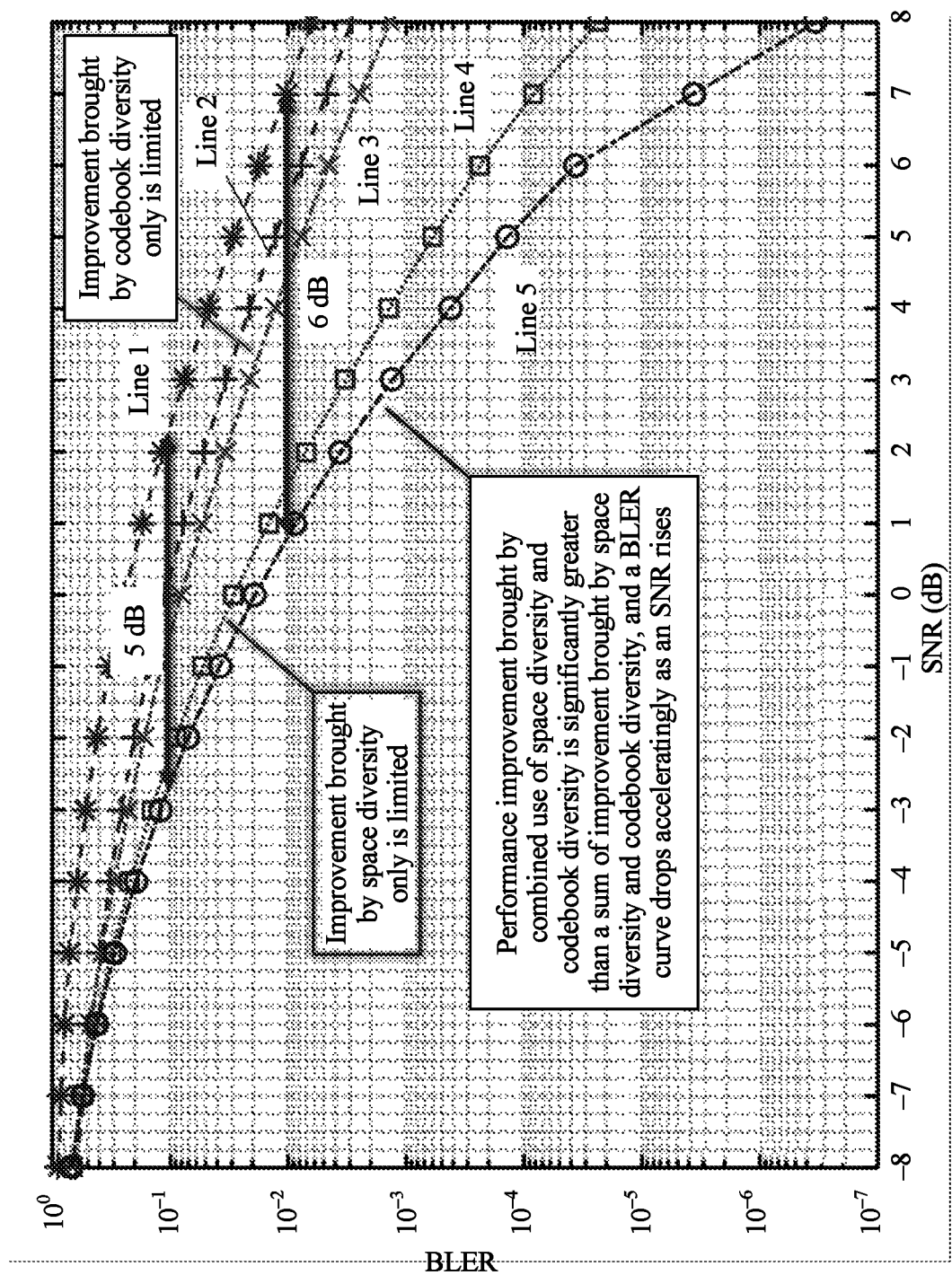
FIG. 11 is a performance analysis diagram of an ultra-reliable communication scheme according to an embodiment of this application.

FIG. 11 is a performance analysis diagram of an ultra-reliable communication scheme according to an embodiment of this application. FIG. 11 shows an example in which data is obtained after mapping is performed for one UE by using two codebooks that occupy mutually different non-zero physical REs and four REs are multiplexed by three UEs. In Extended Pedestrian A model (Extended Pedestrian A model, EPA), statistical analysis is performed, by using 106 subframes, on reliability performance of generating same data copies by using a turbo code at a ⅓ code rate when the UE moves at a speed of 1.2 kilometers per hour (km/h). A result of the statistical analysis is drawn in FIG. 11. In FIG. 11, a line 1 is a performance curve for a case in which no ultra-reliable communication scheme is used, a line 2 is a performance curve for a case in which two codebooks (that have a same RE mapping) that do not occupy mutually different non-zero physical REs are used for a same piece of user data, a line 3 is a performance curve for a case in which two codebooks that occupy mutually different non-zero physical REs are used for a same piece of user data, a line 4 is a performance curve for a case in which a same piece of user data that is mapped by using codebooks that do not occupy mutually different non-zero physical REs is transmitted by using two antennas, and a line 5 is a performance curve for a case in which both space diversity and codebook diversity are used for a same piece of user data. It can be learned from a simulation result that when no codebook diversity is used, a BLER curve drops at an unchanged slope as an SNR rises; when codebook diversity is introduced, a BLER curve drops acceleratingly, but performance improvement is limited; when space diversity is used, a BLER curve drops acceleratingly; and when space diversity and codebook diversity are combined, performance improvement of the BLER is far greater than a sum of improvement brought by the two methods, and a BLER curve drops acceleratingly.

Operation S405: The receive end receives the N sets of codebook-mapped data sent by the transmit end.

Specifically, the receive end receives the N sets of codebook-mapped data from a received signal.

Operation S406: The receive end demodulates and decodes the N sets of codebook-mapped data.

Figure 12:
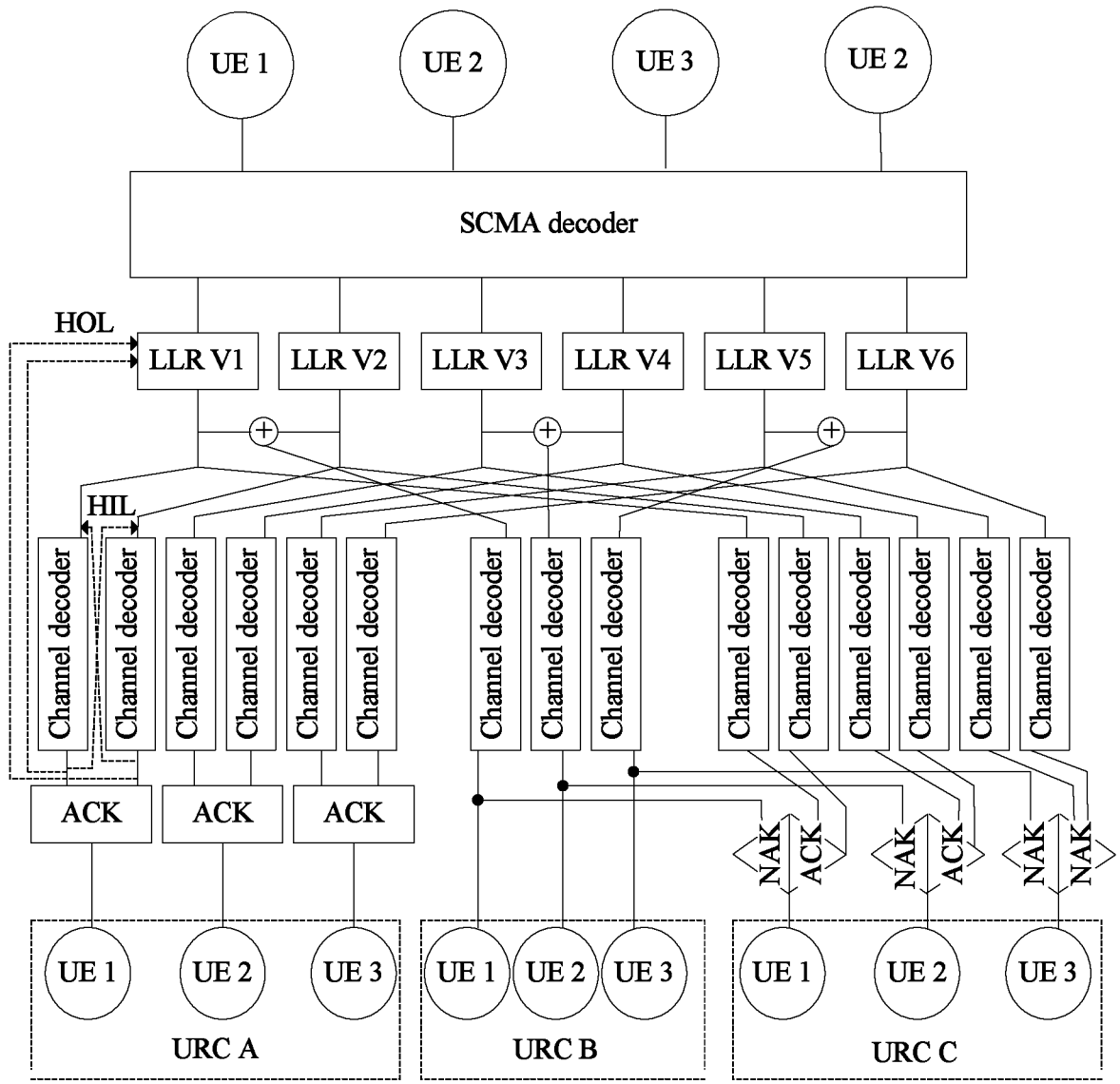
FIG. 12 is a schematic principle diagram of a receive end according to an embodiment of this application.

Specifically, when receiving N sets of codebook-mapped data for data of one user, based on an indication of the transmit end or a URC scheme requested by the receive end, the receive end extracts information from a corresponding resource and performs reliable decoding. FIG. 12 is a schematic principle diagram of a receive end according to an embodiment of this application. As shown in FIG. 12, after obtaining a log likelihood ratio (Log Likelihood Ratio, LLR) of information of each set of codebook-mapped data, an ultra-reliable receive end merges the LLRs, performs channel decoding on the merged LLRs, and then outputs channel decoded data based on a check result of a cyclic redundancy check (Cyclic Redundancy Check, CRC). In this case, the CRC check and the LLR mergence are combined, and whether the CRC check is passed is first determined, and then it is determined whether to merge LLRs, decode the merged LLRs, and output decoded data.

Further, in operation S406, as shown in FIG. 12, the demodulating and decoding the N sets of codebook-mapped data by the receive end may be implemented in the following three implementations:

In a first implementation, the receive end decodes each of the N sets of codebook-mapped data by using a decoder, to obtain N sets of codebook-based channel decoded data; determines whether any of the N sets of codebook-based channel decoded data passes check information check; and if a set of codebook-based channel decoded data passes the check information check, uses the set of codebook-based channel decoded data that passes the check information check as a channel decoding result; or if none of the N sets of codebook-based channel decoded data passes the check information check, uses any of the N sets of codebook-based channel decoded data as a channel decoding result.

Specifically, as shown in a URC A scheme in FIG. 12, LLRs that are output after multiple access decoding is performed on each set of codebook-mapped data are decoded by using different channel decoders. An output with an ACK identifier is preferably selected as a decoding output. In other words, after channel decoding is performed on the N sets of codebook-mapped data, a set of codebook-mapped data that obtains an ACK identifier is output in bits as decoded user data, or if none of the N sets of codebook-mapped data obtains any ACK identifier, any set is selected for output.

In a second implementation, the receive end merges software information that is output after multiple access decoding is performed on the N sets of codebook-mapped data, performs channel decoding on the merged software information, and uses channel decoded data of the merged software information as a channel decoding result.

Specifically, in a URC B scheme in FIG. 12, software information that is output after multiple access decoding is performed on all the N sets of codebook-mapped data is obtained and merged, channel decoding is performed on all the merged software information, and a result is used for output. In other words, after multiple access decoding is performed on the N sets of codebook-mapped data, the output software information is merged, then merged software information is decoded by using a channel decoder, and merged data is output in bits as decoded user data.

In a third implementation, the receive end decodes each of the N sets of codebook-mapped data by using a decoder, to obtain N sets of codebook-based channel decoded data; determines whether any of the N sets of codebook-based channel decoded data passes check information check; and if a set of codebook-based channel decoded data passes the check information check, uses the set of codebook-based channel decoded data that passes the check information check as a channel decoding result; or if none of the N sets of codebook-based channel decoded data passes the check information check, merges software information that is output after multiple access decoding is performed on the N sets of codebook-mapped data, performs channel decoding on the merged software information, and uses channel decoded data of the merged software information as a channel decoding result.

Specifically, in a URC C scheme in FIG. 12, channel decoding is performed on an LLR that is output after multiple access decoding is performed on each set of codebook-mapped data. If an ACK is obtained, a result is output. If an NAK is obtained, the software information is merged and then channel decoding is performed. In other words, after channel decoding is performed on the N sets of codebook-mapped data, if an ACK identifier is obtained, a set of codebook-mapped data that obtains the ACK identifier is output in bits as decoded user data, or if none of the N sets of codebook-mapped data obtains any ACK identifier, after multiple access decoding is performed on the N sets of codebook-mapped data, the output software information is merged and is then decoded by using a channel decoder, and channel decoded output of the merged software is used as decoded user data.

In this embodiment of this application, a derivative joint demodulation and decoding method related to the first implementation and the third implementation is as follows: In an iteration process of channel decoding, software information (such as an LLR) that is output after channel decoding is performed on the N sets of codebook-mapped data is fed back crosswise to channel decoders for the N sets of codebook-mapped data as a decoding priori-probability of the channel decoding, to perform hybrid inner loop (Hybrid Inner Loop, HIL). In addition, a derivative joint demodulation and decoding method related to the first implementation, the second implementation, and the third implementation is as follows: After channel decoding is complete, an LLR that is output after channel decoding is performed on the N sets of codebook-mapped data is fed back crosswise to N sets of multiple access decoders as a decoding priori-probability of the multiple access decoders, to perform hybrid outer loop (Hybrid Outer Loop, HOL).

It should be noted that a processing procedure of a decoding manner of the receive end is not limited to the foregoing three implementations. A derivative ultra-reliable receive end may be obtained with reference to the HIL or the HOL in FIG. 12.

According to one embodiment, after channel encoding is performed on the to-be-sent user data, codebook mapping is performed by using N codebooks that occupy mutually different non-zero physical REs, to obtain the N sets of codebook-mapped data. Because the N pieces of codebook-mapped data are mapped to different non-zero physical REs, codebook diversity of the N sets of codebook-mapped data is ensured in a transmission process. Therefore, mutual interference between a same piece of user data information is prevented without extra latency overheads, and communication reliability is improved by making the most of the codebook diversity. In addition, the N sets of codebook-mapped data are allocated to different antennas and transmitted by using the different antennas. This ensures that each set of codebook-mapped data can use space diversity brought by spatial locations of the different antennas, and can fully use reliability improvement brought by combined use of antenna space diversity and codebook diversity. In addition, channel encoding is performed on the to-be-sent user data by using the M channel encoders, to obtain N sets of encoded data, where M is a positive integer less than or equal to N. Because different channel encoding brings an encoding gain, communication reliability is enhanced by using space diversity, codebook diversity, and the encoding gain.

Figure 13:
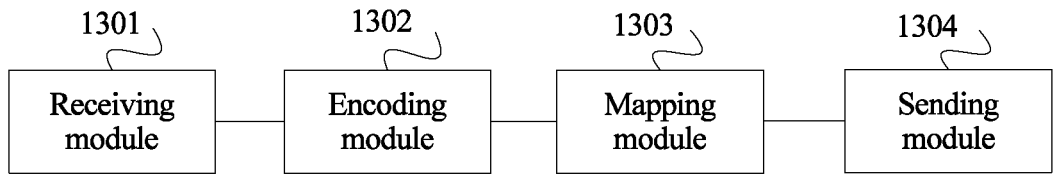
FIG. 13 is a schematic structural diagram of user equipment according to a first embodiment of this application.

FIG. 13 is a schematic structural diagram of user equipment according to a first embodiment of this application. As shown in FIG. 13, the user equipment provided in this embodiment of this application includes a receiving module 1301, an encoding module 1302, a mapping module 1303, and a sending module 1304. The receiving module 1301, the encoding module 1302, the mapping module 1303, and the sending module 1304 are connected in order.

The receiving module 1301 is configured to obtain to-be-sent user data.

The encoding module 1302 is configured to perform channel encoding on the to-be-sent user data to obtain N sets of encoded data.

The mapping module 1303 is configured to perform codebook mapping on each of the N sets of encoded data by using a codebook, to obtain N sets of codebook-mapped data. Different sets of encoded data use codebooks that occupy mutually different non-zero physical REs, the non-zero physical RE means a non-zero waveform obtained after mapped data is mapped to a physical RE, and N is a positive integer greater than or equal to 2.

The sending module 1304 is configured to send the N sets of codebook-mapped data to a base station.

The user equipment provided in one embodiment of this application is configured to perform the technical solution of the transmit end in the method embodiment shown in FIG. 4. An implementation principle and a technical effect of the user equipment are similar to those of the transmit end. Details are not described herein again.

Further, in one embodiment shown in FIG. 13, the sending module 1304 is specifically configured to allocate the N sets of codebook-mapped data to K antennas for transmission. Each of the N sets of codebook-mapped data is allocated to a different antenna, and K is a positive integer greater than or equal to N, so that each set of codebook-mapped data is transmitted by a different antenna.

Further, in one embodiment shown in FIG. 13, the codebook used by the mapping module 1303 to perform codebook mapping includes an SCMA codebook, an IGMA codebook, or a PDMA codebook.

Further, in the embodiment shown in FIG. 13, the encoding module 1302 is specifically configured to perform channel encoding on the to-be-sent user data by using M channel encoders, to obtain the N sets of encoded data, where M is a positive integer less than or equal to N.

Further, in an embodiment shown in FIG. 13, M is equal to N, the encoding module 1302 is specifically configured to perform channel encoding on the to-be-sent user data by using the M channel encoders in M encoding modes, to obtain N sets of different encoded data.

Further, in an embodiment shown in FIG. 13, M is less than N, the encoding module 1302 is specifically configured to encode the to-be-sent user data by using the M channel encoders, with at least one channel encoder using a same encoding mode, and divide encoded data into at least two sets to obtain the N sets of encoded data.

Further, in an embodiment shown in FIG. 13, the receiving module 1301 is further configured to receive a resource configuration message sent by the base station. The resource configuration message includes a codebook pair that occupies mutually different non-zero physical REs. Optionally, the resource configuration message further includes a channel encoding mode and/or an antenna resource mapping mode.

Further, in an embodiment shown in FIG. 13, the sending module 1304 is further configured to send a resource configuration message to the base station. The resource configuration message includes a codebook pair that occupies mutually different non-zero physical REs. Optionally, the resource configuration message further includes a channel encoding mode and/or an antenna resource mapping mode.

Figure 14:
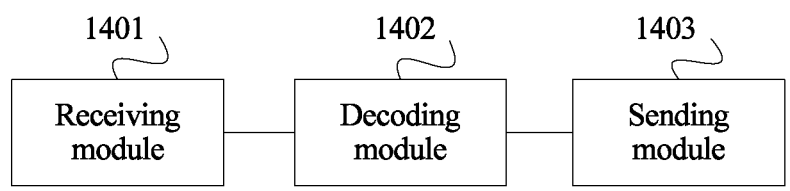
FIG. 14 is a schematic structural diagram of a base station according to a first embodiment of this application.

FIG. 14 is a schematic structural diagram of a base station according to a first embodiment of this application. As shown in FIG. 14, the base station provided in this embodiment of this application includes a receiving module 1401 and a decoding module 1402. The receiving module 1401 is connected to the decoding module 1402.

The receiving module 1401 is configured to receive N sets of codebook-mapped data sent by user equipment. The N sets of codebook-mapped data are obtained after codebook mapping is performed on each of N sets of encoded data by using a codebook. Different sets of encoded data use codebooks that occupy mutually different non-zero physical REs, the non-zero physical RE means a non-zero waveform obtained after mapped data is mapped to a physical RE, and N is a positive integer greater than or equal to 2.

The decoding module 1402 is configured to demodulate and decode the N sets of codebook-mapped data.

The user equipment provided in an embodiment of this application is configured to perform the technical solution of the receive end in the method embodiment shown in FIG. 4. An implementation principle and a technical effect of the user equipment are similar to those of the receive end. Details are not described herein again.

Further, in an embodiment shown in FIG. 14, the decoding module 1402 is specifically configured to: decode each of the N sets of codebook-mapped data by using a decoder, to obtain N sets of codebook-based channel decoded data; determine whether any of the N sets of codebook-based channel decoded data passes check information check; and if a set of codebook-based channel decoded data passes the check information check, use the set of codebook-based channel decoded data that passes the check information check as a channel decoding result; or if none of the N sets of codebook-based channel decoded data passes the check information check, use any of the N sets of codebook-based channel decoded data as a channel decoding result.

Further, in an embodiment shown in FIG. 14, the decoding module 1402 is specifically configured to: merge software information that is obtained after the N sets of codebook-mapped data are decoded, perform channel decoding on the merged software information, and use channel decoded data of the merged software information as a channel decoding result.

Further, in an embodiment shown in FIG. 14, the decoding module 1402 is specifically configured to: decode each of the N sets of codebook-mapped data by using a decoder, to obtain N sets of codebook-based channel decoded data; determine whether any of the N sets of codebook-based channel decoded data passes check information check; and if a set of codebook-based channel decoded data passes the check information check, use the set of codebook-based channel decoded data that passes the check information check as a channel decoding result; or if none of the N sets of codebook-based channel decoded data passes the check information check, merge software information that is obtained after the N sets of codebook-mapped data are decoded, perform channel decoding on the merged software information, and use channel decoded data of the merged software information as a channel decoding result.

Further, in an embodiment shown in FIG. 14, the base station further includes a sending module 1403. The sending module 1403 is connected to the decoding module 1402.

The sending module 1403 is configured to send a resource configuration message to the user equipment. The resource configuration message includes a codebook pair that occupies mutually different non-zero physical REs. Optionally, the resource configuration message further includes a channel encoding mode and/or an antenna resource mapping mode.

Further, in an embodiment shown in FIG. 14, the receiving module 1401 is further configured to receive a resource configuration message sent by a transmit end. The resource configuration message includes a codebook pair that occupies mutually different non-zero physical REs. Optionally, the resource configuration message further includes a channel encoding mode and/or an antenna resource mapping mode.

Figure 15:
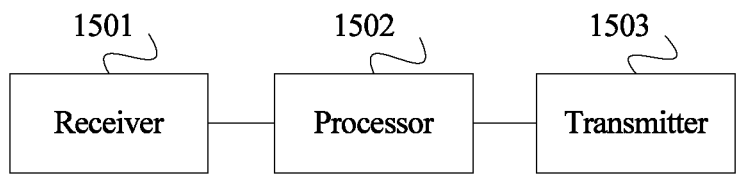
FIG. 15 is a schematic structural diagram of user equipment according to a second embodiment of this application.

FIG. 15 is a schematic structural diagram of user equipment according to a second embodiment of this application. As shown in FIG. 15, the user equipment provided in this embodiment of this application includes a receiver 1501, a processor 1502, and a transmitter 1503. The processor 1502 is separately connected to the receiver 1501 and the transmitter 1503.

The receiver 1501 is configured to obtain to-be-sent user data. The transmitter 1503 is configured to send N sets of codebook-mapped data to a base station.

The processor 1502 may be a general purpose processor 1502, including a central processing unit (Central Processing Unit, CPU) 1502, a network processor (network processor, NP) 1502, or the like; or may be a digital signal processor (Digital Signal Processor, DSP) 1502, an application-specific integrated circuit (Application-Specific Integrated Circuit, ASIC), a field programmable gate array (Field Programmable Gate Array, FPGA) or another programmable logic device, or the like.

When the processor 1502 is a CPU, the user equipment may further include a memory that is configured to store a program. Specifically, the program may include program code, and the program code includes a computer operation instruction. The memory may include a random access memory (random access memory, RAM), and may further include a non-volatile memory (non-volatile memory), for example, at least one magnetic disk storage. When the user equipment runs, the processor 1502 communicates with the memory, and the processor 1502 invokes the instruction stored in the memory, to perform the following operations:

performing channel encoding on the to-be-sent user data to obtain N sets of encoded data; and performing codebook mapping on each of the N sets of encoded data by using a codebook, to obtain N sets of codebook-mapped data, where different sets of encoded data use codebooks that occupy mutually different non-zero physical REs, the non-zero physical RE means a non-zero waveform obtained after mapped data is mapped to a physical RE, and N is a positive integer greater than or equal to 2.

The transmitter 1503 is specifically configured to allocate the N sets of codebook-mapped data to K antennas for transmission. Each of the N sets of codebook-mapped data is allocated to a different antenna, and K is a positive integer greater than or equal to N, so that each set of codebook-mapped data is transmitted by using a different antenna.

The codebook used by the processor 1502 to perform codebook mapping includes an SCMA codebook, an IGMA codebook, or a PDMA codebook.

The processor 1502 is further configured to perform the following operation:

performing channel encoding on the to-be-sent user data by using M channel encoders, to obtain the N sets of encoded data, where M is a positive integer less than or equal to N.

When M is equal to N, the processor 1502 is further configured to perform the following operation:

performing channel encoding on the to-be-sent user data by using the M channel encoders in M encoding modes, to obtain N sets of different encoded data.

When M is less than N, the processor 1502 is further configured to perform the following operation:

encoding the to-be-sent user data by using the M channel encoders, with at least one channel encoder using a same encoding mode, and dividing encoded data into at least two sets to obtain the N sets of encoded data.

The receiver 1501 is further configured to receive a resource configuration message sent by the base station. The resource configuration message includes a codebook pair that occupies mutually different non-zero physical REs. Optionally, the resource configuration message further includes a channel encoding mode and/or an antenna resource mapping mode.

The transmitter 1503 is further configured to send a resource configuration message to the base station. The resource configuration message includes a codebook pair that occupies mutually different non-zero physical REs. Optionally, the resource configuration message further includes a channel encoding mode and/or an antenna resource mapping mode.

The user equipment provided in an embodiment of this application is configured to perform the technical solution of the transmit end in the method embodiment shown in FIG. 4. An implementation principle and a technical effect of the user equipment are similar to those of the transmit end. Details are not described herein again.

Figure 16:
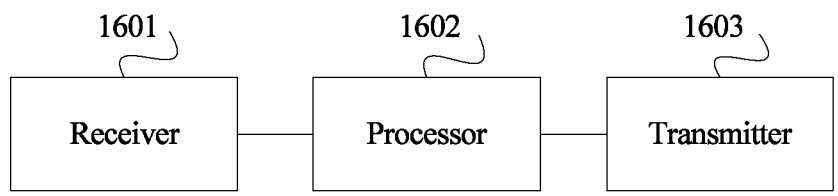
FIG. 16 is a schematic structural diagram of a base station according to a second embodiment of this application.

FIG. 16 is a schematic structural diagram of a base station according to another embodiment of this application. As shown in FIG. 16, the base station provided in this embodiment of this application includes a receiver 1601 and a processor 1602. The receiver 1601 is connected to the processor 1602.

The receiver 1601 is configured to receive N sets of codebook-mapped data sent by user equipment. The N sets of codebook-mapped data are obtained after codebook mapping is performed on each of N sets of encoded data by using a codebook. Different sets of encoded data use codebooks that occupy mutually different non-zero physical REs, the non-zero physical RE means a non-zero waveform obtained after mapped data is mapped to a physical RE, and N is a positive integer greater than or equal to 2.

The processor 1602 may be a general purpose processor 1602, including a central processing unit (Central Processing Unit, CPU) 1602, a network processor (network processor, NP) 1602, or the like; or may be a digital signal processor (Digital Signal Processor, DSP) 1602, an application-specific integrated circuit (Application-Specific Integrated Circuit, ASIC), a field programmable gate array (Field Programmable Gate Array, FPGA) or another programmable logic device, or the like.

When the processor 1602 is a CPU, the base station may further include a memory that is configured to store a program. Specifically, the program may include program code, and the program code includes a computer operation instruction. The memory may include a random access memory (random access memory, RAM), and may further include a non-volatile memory (non-volatile memory), for example, at least one magnetic disk storage. When the base station runs, the processor 1602 communicates with the memory, and the processor 1602 invokes the instruction stored in the memory, to perform the following operations:

demodulating and decoding the N sets of codebook-mapped data.

The processor 1602 is further configured to perform the following operations:

decoding each of the N sets of codebook-mapped data by using a decoder, to obtain N sets of codebook-based channel decoded data;

determining whether any of the N sets of codebook-based channel decoded data passes check information check; and if a set of codebook-based channel decoded data passes the check information check, using the set of codebook-based channel decoded data that passes the check information check as a channel decoding result; or if none of the N sets of codebook-based channel decoded data passes the check information check, using any of the N sets of codebook-based channel decoded data as a channel decoding result.

The processor 1602 is further configured to perform the following operations:

merging software information that is obtained after the N sets of codebook-mapped data are decoded, performing channel decoding on the merged software information, and using channel decoded data of the merged software information as a channel decoding result.

The processor 1602 is further configured to perform the following operations:

decoding each of the N sets of codebook-mapped data by using a decoder, to obtain N sets of codebook-based channel decoded data;

determining whether any of the N sets of codebook-based channel decoded data passes check information check; and if a set of codebook-based channel decoded data passes the check information check, using the set of codebook-based channel decoded data that passes the check information check as a channel decoding result; or if none of the N sets of codebook-based channel decoded data passes the check information check, merging software information that is obtained after the N sets of codebook-mapped data are decoded, performing channel decoding on the merged software information, and using channel decoded data of the merged software information as a channel decoding result.

The receiver 1601 is further configured to: receive a resource configuration message sent by the user equipment. The resource configuration message includes a codebook pair that occupies mutually different non-zero physical REs. Optionally, the resource configuration message further includes a channel encoding mode and/or an antenna resource mapping mode.

Further, in an embodiment shown in FIG. 16, the base station further includes a transmitter 1603. The transmitter 1603 is connected to the processor 1602. The transmitter 1603 is configured to send a resource configuration message to the user equipment. The resource configuration message includes a codebook pair that occupies mutually different non-zero physical REs. Optionally, the resource configuration message further includes a channel encoding mode and/or an antenna resource mapping mode.

The user equipment provided in an embodiment of this application is configured to perform the technical solution of the receive end in the method embodiment shown in FIG. 4. An implementation principle and a technical effect of the user equipment are similar to those of the receive end. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   obtaining, by user equipment, to-be-sent user data;
   performing, by the user equipment, channel encoding on the to-be-sent user data to obtain N sets of encoded data;
   performing, by the user equipment, codebook mapping on each of the N sets of encoded data by using a codebook, to obtain N sets of codebook-mapped data, wherein different sets of encoded data use codebooks that occupy mutually different non-zero physical resource elements (REs), and N is a positive integer greater than or equal to 2; and
   sending, by the user equipment, the N sets of codebook-mapped data to a base station.

2. The method according to claim 1, wherein the sending, by the user equipment, the N sets of codebook-mapped data to the base station comprises:
   allocating, by the user equipment, the N sets of codebook-mapped data to K antennas for transmission, wherein each of the N sets of codebook-mapped data is allocated to a different antenna, and K is a positive integer greater than or equal to N.

3. The method according to claim 1, wherein the codebook comprises a sparse code multiple access (SCMA) codebook, an interleave-grid multiple access (IGMA) codebook, or a pattern division multiple access (PDMA) codebook.

4. The method according to claim 1, wherein the performing, by the user equipment, channel encoding on the to-be-sent user data to obtain N sets of encoded data comprises:
   performing, by the user equipment, channel encoding on the to-be-sent user data by using M channel encoders, to obtain the N sets of encoded data, wherein M is a positive integer less than or equal to N.

5. The method according to claim 4, wherein M is equal to N, and the performing, by the user equipment, channel encoding on the to-be-sent user data by using M channel encoders, to obtain the N sets of encoded data comprises:
   performing channel encoding on the to-be-sent user data by using the M channel encoders in M encoding modes, to obtain N sets of different encoded data.

6. The method according to claim 4, wherein M is less than N, and the performing, by the user equipment, channel encoding on the to-be-sent user data by using M channel encoders, to obtain the N sets of encoded data comprises:
   encoding the to-be-sent user data by using the M channel encoders, with at least one channel encoder using a same encoding mode, and dividing data obtained by using the same encoding mode into at least two sets to obtain the N sets of encoded data.

7. The method according to claim 1, wherein before the obtaining, by user equipment, to-be-sent user data, the method further comprises:
   receiving, by the user equipment, a resource configuration message sent by the base station, wherein the resource configuration message comprises a codebook pair that occupies mutually different non-zero physical REs.

8. The method according to claim 1, wherein before the obtaining, by user equipment, to-be-sent user data, the method further comprises:
   sending, by the user equipment, a resource configuration message to the base station, wherein the resource configuration message comprises a codebook pair that occupies mutually different non-zero physical REs.

9. A data transmission method, comprising:
   receiving, by a base station, N sets of codebook-mapped data sent by user equipment, wherein the N sets of codebook-mapped data are obtained after codebook mapping is performed on each of N sets of encoded data by using a codebook, different sets of encoded data use codebooks that occupy mutually different non-zero physical resource elements (REs), and N is a positive integer greater than or equal to 2; and
   demodulating and decoding, by the base station, the N sets of codebook-mapped data.

10. The method according to claim 9, wherein the demodulating and decoding, by the base station, the N sets of codebook-mapped data comprises:
    decoding each of the N sets of codebook-mapped data by using a decoder, to obtain N sets of codebook-based channel decoded data;
    determining whether any of the N sets of codebook-based channel decoded data passes check information check; and
    if a set of codebook-based channel decoded data passes the check information check, using the set of codebook-based channel decoded data that passes the check information check as a channel decoding result; or if none of the N sets of codebook-based channel decoded data passes the check information check, using any of the N sets of codebook-based channel decoded data as a channel decoding result.

11. User equipment, comprising a receiver, a processor, and a transmitter, wherein the processor is separately connected to the receiver and the transmitter;
   the receiver is configured to obtain to-be-sent user data;
   the processor is configured to perform channel encoding on the to-be-sent user data to obtain N sets of encoded data; and perform codebook mapping on each of the N sets of encoded data by using a codebook, to obtain N sets of codebook-mapped data, wherein different sets of encoded data use codebooks that occupy mutually different non-zero physical resource element REs, and N is a positive integer greater than or equal to 2; and
   the transmitter is configured to send the N sets of codebook-mapped data to a base station.

12. The user equipment according to claim 11, wherein the transmitter is specifically configured to:
   allocate the N sets of codebook-mapped data to K antennas for transmission, wherein each of the N sets of codebook-mapped data is allocated to a different antenna, and K is a positive integer greater than or equal to N.

13. The user equipment according to claim 11, wherein the codebook comprises a sparse code multiple access (SCMA) codebook, an interleave-grid multiple access (IGMA) codebook, or a pattern division multiple access (PDMA) codebook.

14. The user equipment according to claim 11, wherein the processor is specifically configured to:
   perform channel encoding on the to-be-sent user data by using M channel encoders, to obtain the N sets of encoded data, wherein M is a positive integer less than or equal to N.

15. The user equipment according to claim 14, wherein M is equal to N, and the processor is specifically configured to:
   perform channel encoding on the to-be-sent user data by using the M channel encoders in M encoding modes, to obtain N sets of different encoded data.

16. The user equipment according to claim 14, wherein M is less than N, and the processor is specifically configured to:
   encode the to-be-sent user data by using the M channel encoders, with at least one channel encoder using a same encoding mode, and divide data obtained by using the same encoding mode into at least two sets to obtain the N sets of encoded data.

17. The user equipment according to claim 11, wherein the receiver is further configured to:
   receive a resource configuration message sent by the base station, wherein the resource configuration message comprises a codebook pair that occupies mutually different non-zero physical REs.

18. The user equipment according to claim 11, wherein the transmitter is further configured to:
   send a resource configuration message to the base station, wherein the resource configuration message comprises a codebook pair that occupies mutually different non-zero physical REs.

19. A base station, comprising a receiver and a processor, wherein the receiver is connected to the processor;
   the receiver is configured to receive N sets of codebook-mapped data sent by user equipment, wherein the N sets of codebook-mapped data are obtained after codebook mapping is performed on each of N sets of encoded data by using a codebook, different sets of encoded data use codebooks that occupy mutually different non-zero physical resource elements (REs), and N is a positive integer greater than or equal to 2; and
   the processor is configured to demodulate and decode the N sets of codebook-mapped data.

20. The base station according to claim 19, wherein the processor is specifically configured to:
   decode each of the N sets of codebook-mapped data by using a decoder, to obtain N sets of codebook-based channel decoded data;
   determine whether any of the N sets of codebook-based channel decoded data passes check information check; and
   if a set of codebook-based channel decoded data passes the check information check, use the set of codebook-based channel decoded data that passes the check information check as a channel decoding result; or if none of the N sets of codebook-based channel decoded data passes the check information check, use any of the N sets of codebook-based channel decoded data as a channel decoding result.

* * * * *